(12) United States Patent
Matsunaga

(10) Patent No.: US 8,838,323 B2
(45) Date of Patent: Sep. 16, 2014

(54) DRIVING ASSISTANCE DEVICE AND DRIVING ASSISTANCE METHOD

(75) Inventor: Masaki Matsunaga, Ashigarakami-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 799 days.

(21) Appl. No.: 12/639,307

(22) Filed: Dec. 16, 2009

(65) Prior Publication Data
US 2010/0168998 A1    Jul. 1, 2010

(30) Foreign Application Priority Data

Dec. 26, 2008 (JP) ................................ 2008-335134

(51) Int. Cl.
*B60W 40/08* (2012.01)
*B60W 40/09* (2012.01)
*B62D 6/00* (2006.01)
*B60W 30/10* (2006.01)

(52) U.S. Cl.
CPC ..................................... *B60W 30/10* (2013.01)
USPC .................. 701/28; 701/41; 701/532; 701/70

(58) Field of Classification Search
CPC . B60W 10/06; B60W 10/18; B60W 2420/24; B60W 2420/42; B60W 2550/402; B60W 30/10; B60W 40/08; B60W 50/10
USPC ........................... 701/2, 23, 68, 200; 250/221
See application file for complete search history.

(56) References Cited

U.S. PATENT DOCUMENTS

| | | | |
|---|---|---|---|
| 5,625,577 A * | 4/1997 | Kunii et al. ...................... 703/2 |
| 5,835,008 A * | 11/1998 | Colemere, Jr. ................ 340/439 |
| 6,622,087 B2 * | 9/2003 | Anderson ..................... 701/423 |
| 7,313,957 B1 * | 1/2008 | Kuramori et al. .......... 73/379.01 |
| 2003/0014162 A1 * | 1/2003 | Sadano ............................ 701/1 |
| 2004/0099825 A1 * | 5/2004 | Huang et al. ............. 250/559.29 |
| 2005/0090938 A1 * | 4/2005 | Ranelli ............................ 701/1 |
| 2005/0113999 A1 * | 5/2005 | Tange et al. ..................... 701/41 |
| 2005/0273215 A1 * | 12/2005 | Kuge ............................... 701/1 |
| 2006/0074552 A1 * | 4/2006 | Naito et al. .................... 701/211 |
| 2007/0043491 A1 * | 2/2007 | Goerick et al. ................. 701/41 |
| 2007/0219746 A1 * | 9/2007 | Vancil et al. .................. 702/182 |
| 2008/0130953 A1 * | 6/2008 | Ishikawa ....................... 382/103 |

FOREIGN PATENT DOCUMENTS

| | | | |
|---|---|---|---|
| DE | 19641470 A1 * | 4/1998 |
| JP | 2001-1921 | 1/2001 |
| JP | 2001-39326 | 2/2001 |
| JP | 2004009765 A * | 1/2004 |
| JP | 2006-7836 A | 1/2006 |
| JP | 2007-176396 | 7/2007 |
| JP | 2008-140268 | 6/2008 |

* cited by examiner

*Primary Examiner* — Helal A Algahaim
*Assistant Examiner* — Charles J Han
(74) *Attorney, Agent, or Firm* — Oblon, Spivak, McClelland, Maier & Neustadt, L.L.P.

(57) ABSTRACT

A driving assistance device includes an operation prediction unit and a travel trajectory generation unit. The operation prediction unit predicts that a driving operation is to be performed by a driver of a vehicle before the driver performs the driving operation. The travel trajectory generation unit generates a target travel trajectory of the vehicle based on a prediction result of the driving operation that has been predicted by the operation prediction unit.

18 Claims, 20 Drawing Sheets

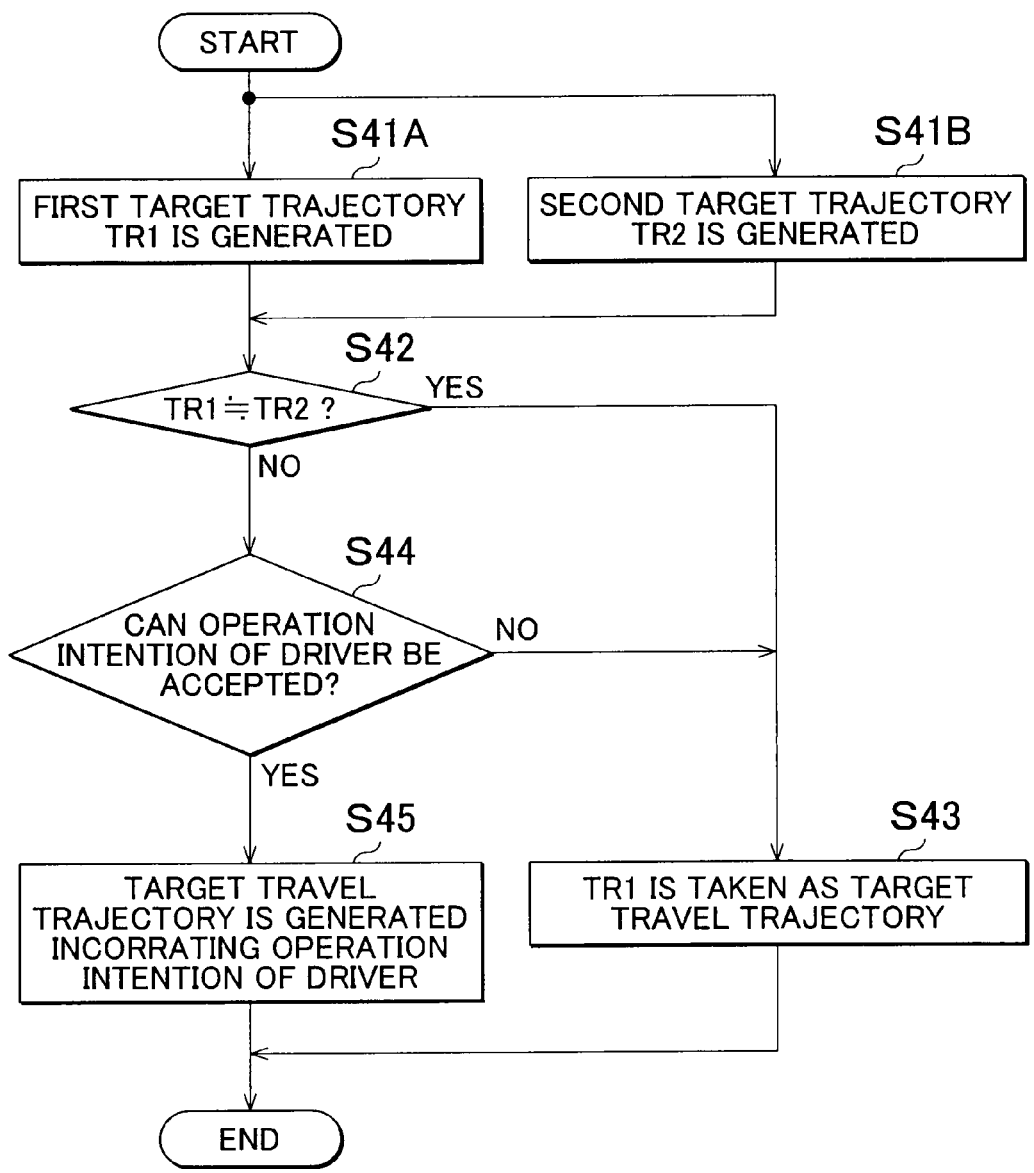

DRIVING ASSISTANCE DEVICE AND DRIVING ASSISTANCE METHOD

INCORPORATION BY REFERENCE

The disclosure of Japanese Patent Application No. 2008-335134 filed on Dec. 26, 2008 including the specification, drawings and abstract is incorporated herein by reference in its entirety.

BACKGROUND OF THE INVENTION

1. Field of the Invention

The invention relates to a driving assistance device and a driving assistance method for assisting a driver in driving a vehicle.

2. Description of the Related Art

A variety of driving assistance techniques for assisting the driver have been suggested and put to practical use in order to increase safety and reduce a workload on a driver of a vehicle such as a passenger automobile, a truck, or a bus. In one of such driving assistance techniques that has been suggested and put to practical use, the vehicle is prevented from departing from a traffic lane, for example, by steering assist conducted on the basis of information relating to surrounding environment of the vehicle, such as information relating to a lane in the traveling direction of the vehicle. For example, Japanese Patent Application Publication No. 2001-1921 (JP-A-2001-1921, paragraphs [0005] and [0022]) describes a technique for establishing a target trajectory of a host vehicle and controlling the actuator so as to come close to the target trajectory.

However, with a driving assistance technique, driving control of the vehicle has to be performed according to the driver's intention. Therefore, the driving control that is automatically executed in the driving assistance control is required to comply with the driver's intention. The automatic driving control of the vehicle, such as the lane keep control that has heretofore been suggested, is not changed till the driver operates the vehicle by himself. Accordingly, the driver's intention is difficult to be incorporated in the driving control of the vehicle, and a conflict between the driving control following the driver's intention and the driving assistance control can occur in the control device.

As a result, the driver feels uncomfortable and the operation feeling can be degraded. With the technique described in JP-A-2001-1921, if the driver operates the vehicle when the driving assistance is executed, the driving assistance control to control the vehicle to travel along the target trajectory that has been generated in advance may contradict the driver's intention, and thus the driver may feel uncomfortable and the operation feeling may degrade. With this respect, such a driving assistance technique can be improved.

SUMMARY OF THE INVENTION

The invention provides a driving assistance device and a driving assistance method that reduce the uncomfortable feeling experienced by the vehicle driver when the driving assistance control to assists the vehicle driver is executed.

The first aspect of the invention relates to a driving assistance device including an operation prediction unit that predicts that a driving operation is to be performed by a driver of a vehicle before the driver performs the driving operation; and a travel trajectory generation unit that generates a target travel trajectory of the vehicle based on a prediction result of the driving operation that has been predicted by the operation prediction unit.

In the driving assistance device, the travel trajectory generation unit may generate a first travel trajectory based on information relating to environment surrounding the vehicle and a second travel trajectory based on the prediction result of the driving operation that has been predicted by the operation prediction unit, and when there is an unallowable difference between the first travel trajectory and the second travel trajectory, may generate the target travel trajectory by using the prediction result of the driving operation that has been predicted by the operation prediction unit.

In the driving assistance device, the operation prediction unit may predict the driving operation based on musculoskeletal state information of the driver.

In the driving assistance device, the operation prediction unit may predict the driving operation so as to satisfy a constraint, that is a range of motion of a body part that relates to the driving operation, the range of motion being determined based on a range of motion of human body joint.

In driving assistance device, the operation prediction unit may predict a steering direction in which the driver performs a steering operation based on a constraint of an arm that is determined based on a range of motion of an elbow joint, and the travel trajectory generation unit may generate the target travel trajectory following the steering direction when the steering operation by the driver is predicted.

The driving assistance device may further includes a travel function control unit. The travel function control unit may adjust the target travel trajectory generated by the travel trajectory generation unit and an actual steering operation performed by the driver, and may control a travel function of the vehicle based on the adjustment result.

In the driving assistance device, the operation prediction unit may predict a braking operation of the driver based on a constraint of a leg that is determined based on a range of motion of a knee joint and a thigh joint, and when the braking operation of the driver is predicted, the travel trajectory generation unit may generate a travel trajectory of the vehicle by assigning higher priority to a movement in the longitudinal direction of the vehicle than to a movement in the lateral direction of the vehicle.

The driving assistance device may further include a travel function control unit. The travel function control unit may adjust the target travel trajectory generated by the travel trajectory generation unit and an actual braking operation by the driver, and may control a travel function of the vehicle based on the adjustment result.

The second aspect of the invention relates to a driving assistance method including: predicting that a driving operation is to be performed by a driver of a vehicle before the driver performs the driving operation; and generating a target travel trajectory of the vehicle based on a prediction result of the driving operation.

In the driving assistance method, when there is an unallowable difference between the first travel trajectory and the second travel trajectory, the target travel trajectory may be generated by using a prediction result of the driving operation.

In the driving assistance method, the driving operation may be predicted based on musculoskeletal state information of the driver.

In the driving assistance method, the driving operation may be predicted so as to satisfy a constraint, that is a range of motion of a body part that relates to the driving operation determined based on a range of motion of human body joint.

The driving assistance device and driving assistance method can reduce the uncomfortable feeling of the vehicle driver when a driving assistance is executed to assists the vehicle driver.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 8 is a flowchart illustrating the procedure of a target travel trajectory generation method A;

DETAILED DESCRIPTION OF EMBODIMENTS

The invention will be described below in greater detail with reference to the appended embodiments. The invention is not limited by the contents explained hereinbelow. Further, the below-described structural elements include those that can be easily assumed by a person skilled in the art and also substantially identical structural elements and the so-called equivalents.

A specific feature of the embodiment is that when driving assistance that assists a vehicle driver is executed, a driving operation that will be performed by a driver of a vehicle is predicted by using an operation prediction means before the driver performs the driving operation, and a target travel trajectory that is a target for the vehicle is generated by a travel trajectory generation means on the basis of a prediction result of the operation prediction means. In the embodiment, the travel trajectory is a path along which the vehicle is assumed to travel from now on and the travel trajectory includes information relating to the speed and acceleration of the vehicle. The driving assistance as referred to herein is a control of steering, braking force or drive force of the vehicle performed on the basis of information relating to surrounding environment of the vehicle or a state of the vehicle in order to assist the driver of the vehicle.

Figure 1:
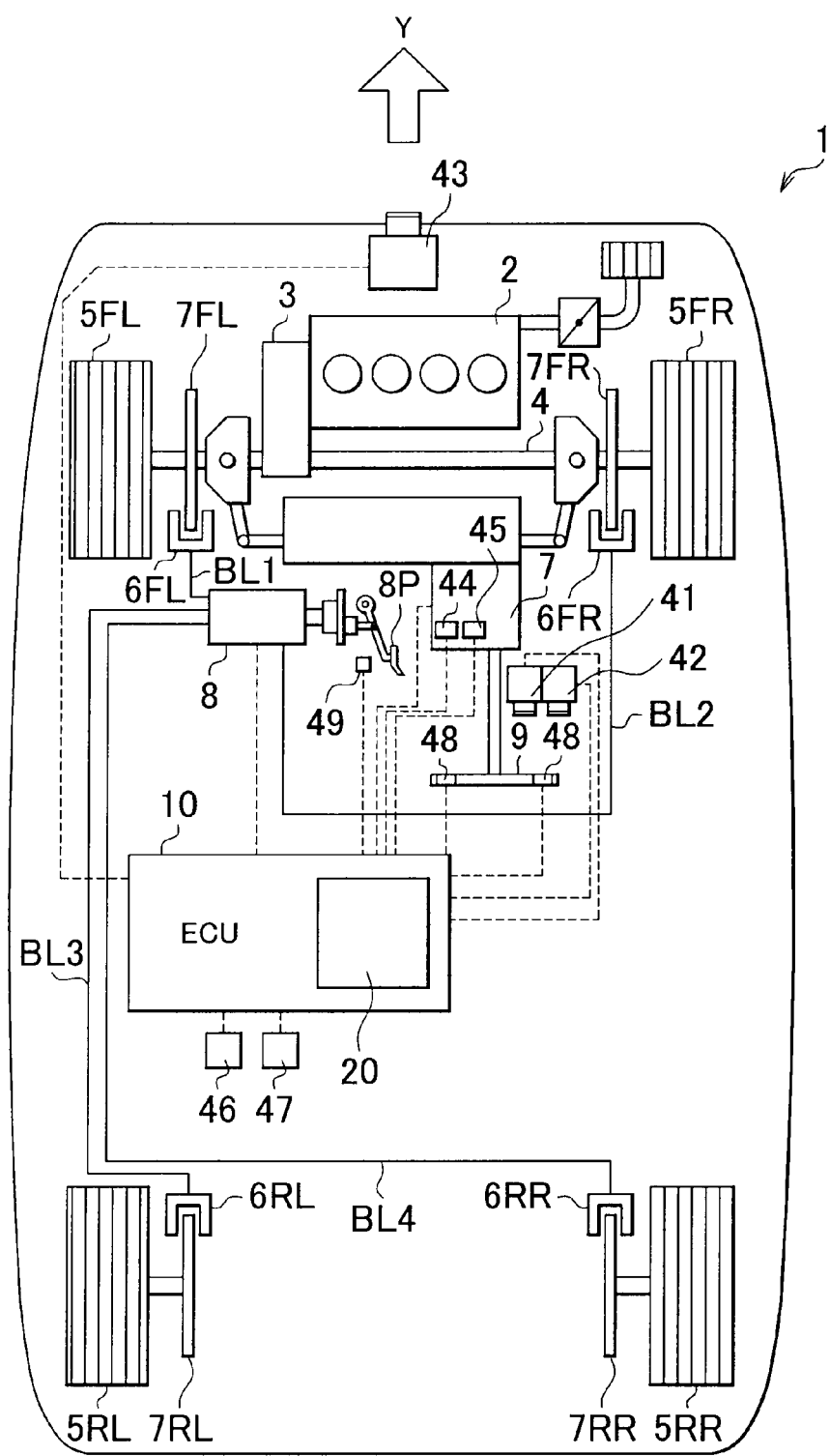
FIG. 1 is a schematic configuration diagram illustrating a configuration example of a vehicle provided with a driving assistance device of the embodiment.

FIG. 1 is a schematic configuration diagram illustrating a configuration example of a vehicle provided with a driving assistance device of the embodiment. In FIG. 1, a vehicle 1 is assumed to move forward in the direction of arrow Y shown in FIG. 1. The direction of forward movement of the vehicle 1 is the direction from a driver's seat where the driver sits in the vehicle 1 toward a steering wheel 9. The left and right sides are distinguished with reference to the direction of forward movement of the vehicle 1 (direction of arrow Y in FIG. 1). Thus, the term "left" denotes the left side with respect to the direction in which the vehicle 1 moves forward, and the term "right" denotes the right side with respect to the direction in which the vehicle 1 moves forward. As for the front and rear of the vehicle 1, the direction in which the vehicle 1 moves forward is taken as "front" and the direction in which the vehicle 1 moves backward, that is, the direction opposite to the direction in which the vehicle 1 moves forward is taken as "rear". Further, the term "below" means a side in the gravity action direction and the term "above" means a side opposite that in the gravity action direction.

Initially, the general configuration of the vehicle 1 will be explained. The vehicle 1 is provided with a total of four wheels: a front left wheel 5FL, a front right wheel 5FR, a rear left wheel 5RL, and a rear right wheel 5RR. The vehicle 1 has an internal combustion engine 2 as a power generation means. In the embodiment, the internal combustion engine 2 is installed at the front side in the advance direction of the vehicle 1 (direction of arrow Y in FIG. 1). The power generated by the internal combustion engine 2 is inputted in a transmission 3 and reduced to a revolution speed suitable for causing the vehicle 1 to move and then transmitted via a drive shaft 4 to the front left wheel 5FL and front right wheel 5FR that are the drive wheels. As a result, the vehicle 1 is driven. In the embodiment, the internal combustion engine 2 is an internal combustion engine of a spark ignition system of a reciprocating type that uses gasoline as a fuel, but the internal combustion engine 2 is not limited to such a configuration. The installation position of the internal combustion engine 2 in the vehicle 1 is not limited to that described in the embodiment.

The power generation means of the vehicle 1 is not limited to the internal combustion engine. For example, a power generation means of the so-called hybrid type in which the internal combustion engine is combined with an electric motor may be also provided, or an electric motor alone may be used as the power generation means. In a case where an electric motor alone is used as a power generation means, the so-called in-wheel motor system may be used in which an electric motor is provided in each wheel. Further, the transmission 3 may be provided with the so-called drive power distribution function, that is, a function that makes it possible to change the drive force of the front left wheel 5FL and the drive force of the right front wheel 5FR.

The front left wheel 5FL and front right wheel 5FR of the vehicle 1 are the drive wheels of the vehicle 1 and also function as steer wheels. The rear left wheel 5RL and rear right wheel 5RR are trailer wheels of the vehicle 1. Thus, the vehicle 1 uses a drive system of the so-called Front engine Front drive (FF) type. The drive system of the vehicle 1 is not limited to the FF system and may be the so called Front engine Rear drive (FR) system or a 4 Wheel Drive (4WD) system. The vehicle 1 may be also provided with a drive system that can change the drive force of each drive wheel to control the turning performance of the vehicle 1 and improve the running stability of the vehicle 1.

In the vehicle 1 of the embodiment, the operation of the steering wheel 9 by the driver is transmitted via a steering assist device 7 to the front left wheel 5FL and front right wheel 5FR, thereby steering the front left wheel 5FL and front right wheel 5FR. The steering assist device 7 has a steering force assist function and a steering characteristic change function. The steering force assist function reduces the steering force of the driver by providing an assist steering force to a steering mechanism with an electric motor or the like. The steering characteristic change function changes the steering angle of the front left wheel 5FL and front right wheel 5FR relative to the operation amount of the steering wheel 9 according to the driving state of the vehicle 1 (for example, the speed of the vehicle 1 or surrounding environment of the vehicle 1). The steering assist device 7 is controlled by an electronic control unit (ECU) 10 and a driving assistance device 20. Thus, the vehicle 1 is provided with the so-called steer-by-wire system constituted by the ECU 10, driving assistance device 20, the steering assist device 7, and so forth. The driving assistance device 20 is included in the ECU 10 and executes a driving assistance method of the embodiment.

The front left wheel 5FL, front right wheel 5FR, rear left wheel 5RL, and rear right wheel 5RR are provided with brake cylinders 6FL, 6FR, 6RL, and 6RR, and brake rotors 7FL, 7FR, 7RL, and 7RR, respectively. The brake cylinders 6FL, 6FR, 6RL, and 6RR are connected by brake pipes BL1, BL2, BL3, and BL4 to a brake actuator 8. The brake actuator 8 transmits the input force generated when the driver of the vehicle 1 depresses a brake pedal 8P to the respective brake cylinders 6FL, 6FR, 6RL, and 6RR via a brake oil located inside the brake pipes BL1, BL2, BL3, and BL4. Using the transmitted input force, the brake cylinders 6FL, 6FR, 6RL, and 6RR cause brake pads to clamp the brake rotors 7FL, 7FR, 7RL, and 7RR, and thus generate a brake force to the front left wheel 5FL, front right wheel 5FR, rear left wheel 5RL, and rear right wheel 5RR.

The brake actuator 8 is controlled by the ECU 10 and driving assistance device 20 and can generate different brake forces for the front left wheel 5FL, front right wheel 5FR, rear left wheel 5RL, and rear right wheel 5RR. Further, for example, in a case where the ECU 10 and driving assistance device 20 have detected that the vehicle 1 rapidly approaches a vehicle that travels in front or an obstacle located in front of the host vehicle, the brake actuator 8 is controlled by the ECU 10 and driving assistance device 20, and generates brake forces for the front left wheel 5FL, front right wheel 5FR, rear left wheel 5RL, and rear right wheel 5RR, regardless of the brake operation performed by the driver. Such a brake system of the vehicle 1 that is constituted by the ECU 10, driving assistance device 20, brake actuator 8, brake cylinders 6FL, 6FR, 6RL, and 6RR, and so forth is the so-called brake-by-wire system.

The vehicle 1 is provided with sensors that detect the state of the driver of the vehicle 1, sensors that detect information relating to the surrounding environment of the vehicle 1, for example, information relating to lane markings that divide traffic lanes, and sensors that detect the driving state of the vehicle 1. In the embodiment, the sensors that detect the state of the driver of the vehicle 1 include an upper body state detection camera (first driver state detection means) 41, a lower body state detection camera (second driver state detection means) 42, a contact motion sensor (contact-type driver state detection means) 48, a contactless motion sensor (contactless driver state detection means) 49, a steering angle sensor 44 that detects a steering angle of the steering wheel 9, and a steering torque sensor 45 that detects a steering torque of the steering wheel 9. All these sensors together are called driver state detection means.

The upper body state detection camera 41 and lower body state detection camera 42 have a function of monitoring the position of the driver's joints and motion thereof and picking up image information (including dynamic images) for measuring the length of interjoint links or the like. In the embodiment, the driving assistance device 20 predicts the direction and degree of operation performed by the driver with respect to the operation means of the vehicle 1, such as the steering wheel 9 and brake pedal, from the position of driver's joints and motion thereof that are picked up by the upper body state detection camera 41 and lower body state detection camera 42, or from indications relating to the motion. An operation performed by the driver of the vehicle 1 with respect to the operation means of the vehicle 1 is called "a driving operation". It will be sometimes simply referred to hereinbelow as "operation".

The upper body state detection camera 41 and lower body state detection camera 42 are disposed inside the cabin of the vehicle 1 in any position in which they can pick up the image of the driver (in the vehicle, below the back mirror or dashboard). In the embodiment, the state of the upper body and lower body of the driver may be picked up and detected with one camera (image pickup means).

The image information relating to the driver that has been picked up by the upper body state detection camera 41 and lower body state detection camera 42 is subjected to image processing such as binarization processing in the driving assistance device 20, so that it can be used to detect the joint bending angle of the driver. In the embodiment, the upper body state detection camera 41 picks up image information that will be used by the driving assistance device 20 to observe the position of each joint of the driver and detect the inclination of the shoulder line of the driver and inclination angle of the body.

The type of the upper body state detection camera 41 and lower body state detection camera 42 is not particularly limited, but it is preferred that the cameras output the picked-up image information relating to the driver as electric signals. The upper body state detection camera 41 and lower body state detection camera 42 may be infrared cameras. An infrared camera may pick up images even in the darkness and requires no illumination. Therefore, it can pick up the images relating to the state of the driver, without illumination, even when the vehicle 1 travels in the nighttime or in a tunnel.

The contact motion sensor 48 is mounted on the steering wheel 9. The contact motion sensor 48 has a function of directly detecting the state of the driver by coming into contact with part of the driver's body. The contact motion sensor 48 mounted on the steering wheel 9 is a pressure-sensitive sensor and detects the state of driver's palms that hold the steering wheel 9 (grasping force or direction of palm movement). As a result, indications relating to the operation of the steering wheel 9 by the driver (for example, variation of the grasping force and the application state of the palm force) can be detected. Therefore, the driving assistance device 20 can predict the direction and degree of the operation performed by the driver with respect to the steering wheel 9. Further, the steering torque sensor 45 is used to assist a steering force, but the operation performed by the driver with respect to the steering wheel 9 or indications thereof can be also detected by using the steering torque sensor 45.

The contact motion sensor may be provided at the vehicle seat where the driver sits. As a result, the distribution of load along the bearing surface of the seat can be detected. When the driver starts operating the vehicle, changes in the load distribution are detected as the driver's operation or indications thereof and the detected values are used by the driving assistance device 20 to predict the direction and degree of operation that will be next performed by the driver.

The contactless motion sensor 49 has a function of detecting whether the driver approaches the brake pedal 8P, steering wheel 9, accelerator pedal, and shift lever that are the operation means (driver's operation objects) of the vehicle 1. The contactless motion sensor 49 is disposed at the operation means of the vehicle 1 and can use, for example, an electrostatic capacitance sensor or an optical sensor. In the embodiment, the contactless motion sensor 49 is a sensor of an electrostatic capacitance type that is disposed at the brake pedal 8P. This sensor detects whether the driver's foot approaches the brake pedal 8P. More specifically, the contactless motion sensor 49 detects the change in the electrostatic capacitance caused by the variation in the distance between the driver's foot and the brake pedal 8P and thus detects the approach of the foot.

For example, an traveling direction information detection sensor 43 is used as the sensor that detects information relating to surrounding environment of the vehicle 1 (surrounding environment information detection means). The traveling direction information detection sensor 43 is provided at the front side in the traveling direction of the vehicle 1 and detects information relating to the surrounding environment of the vehicle 1, in particular information in the traveling direction of the vehicle 1. The traveling direction information of the vehicle 1, as referred to herein, is for example, information relating to lane markings that divide traffic lanes where the vehicle travels, presence or absence of intersections, increase and decrease in the number of traffic lanes, and presence or absence of a vehicle or an object in front or diagonally in front. The traveling direction information detection sensor 43 is, for example, a camera or a milliwave radar. A rear or front side monitor (a camera, an electrostatic capacitance sensor, or a milliwave radar) may be provided in addition to the traveling direction information detection sensor 43. Hence, the driving assistance device 20 can collect more information relating to the surrounding environment of the vehicle 1.

Further, for example, a navigation device using a global positioning system (GPS) may be used as a surrounding environment information detection means to detect information relating to the surrounding environment of the vehicle 1. In this case, the driving assistance device 20 can detect the present position of the host vehicle and surrounding environment (for example, road information) in the present position of the host vehicle with the navigation device. Where the driving assistance device 20 acquires the information relating to the surrounding environment of the vehicle 1 that is detected with the surrounding environment information detection means and implements the driving assistance method of the embodiment, it is possible to improve the prediction accuracy of the operations performed by the driver of the vehicle 1 and improve the generation accuracy of a target travel trajectory that is the travel target for the vehicle 1.

The driving state of the vehicle 1 is detected by an acceleration sensor 46 and a yaw rate sensor 47. These sensors are together referred to as host vehicle state detection means. The driving state of the vehicle 1 is determined, for example, by a longitudinal speed and a longitudinal acceleration of the vehicle 1 (speed and acceleration in the front-rear directions of the vehicle 1), a lateral speed and a lateral acceleration of the vehicle 1 (speed and acceleration in the direction perpendicular to the front-rear direction), a yaw angle, a yaw angular speed, and a yaw angular acceleration of the vehicle 1, and a slip angle, a slip angular speed, and a slip angular acceleration of the vehicle 1. The above-described driver detection means, surrounding environment information detection means, and host vehicle state detection means are exemplary and not limited to the above-described sensors.

Figure 2:
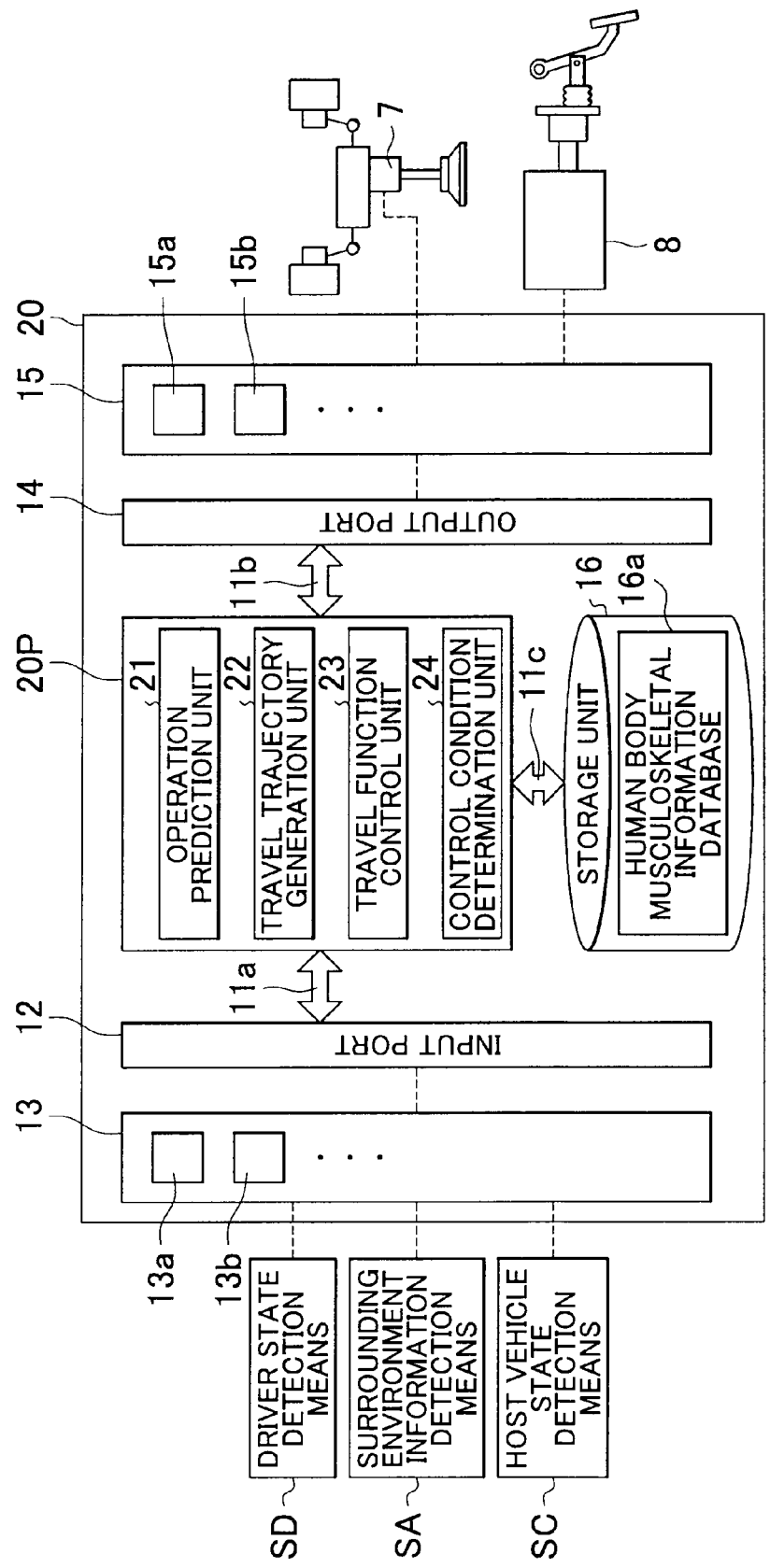
FIG. 2 is an explanatory diagram illustrating the configuration of the driving assistance device of the embodiment.

FIG. 2 is an explanatory diagram illustrating the configuration of the driving assistance device of the embodiment. The driving assistance device 20 is included in the ECU 10 shown in FIG. 1 and configured to implement the driving assistance method of the embodiment as one function of the ECU 10. The driving assistance device 20 is provided with a processing unit 20P constituted by the so-called microprocessors and implements the driving assistance method of the embodiment according to a computer program for the driving assistance method of the embodiment that is stored in a memory unit 16.

The processing unit 20P and storage unit 16 are connected by a data bus 11c and can communicate with each other. The driving assistance device 20 is provided with an input port 12 and an input interface 13 for the processing unit 20P to acquire information necessary for implementing the driving assistance method of the embodiment. The driving assistance device 20 is also provided with an output port 14 and an output interface 15 for actuating the control object. The processing unit 20P and the input port 12 are connected by a data bus 11a, and the processing unit 20P and the output port 14 are connected by a data bus 11b.

The input interface 13 is connected to the input port 12. A driver state detection means SD for detecting the state of the driver that drives the vehicle 1, a surrounding environment information detection means SA for detecting information relating to the environment surrounding the vehicle 1, a host vehicle state detection means SC for detecting the state of the vehicle 1, and other detection means for acquiring information necessary for implementing the driving assistance method of the embodiment are connected to the input interface 13. Signals outputted from these detection means are converted into signals that can be used by the processing unit 20P by an analog-to-digital A/D converter 13a or a digital input buffer 13b located in the input interface 13 and sent to the input port 12. As a result, the processing unit 20P of the driving assistance device 20 can acquire information necessary for implementing the driving assistance method of the embodiment.

The output port 14 is connected to the output interface 15. The steering assist device 7 and brake actuator 8 are connected as control objects in the driving assistance method of the embodiment to the output interface 15. The output interface 15 is provided with control circuits 15a, 15b and actuate the steering assist device 7 and brake actuator 8 on the basis of control signals computed by the processing unit 20P.

The steering assist device 7 provided in the vehicle 1 of the embodiment is provided with the so-called electronic power steering (EPS) device and a variable gear ratio steering (VGRS) device. Thus, the steering assist device 7 assists the operation of the steering wheel 9 with an electric motor and also changes the steering angle or steering speed of the front wheels with respect to the input from the steering wheel 9 according to the vehicle speed or drive force detected by the host vehicle state detection means SC or surrounding information (for example, state of the road and presence of other vehicles around the host vehicle) of the vehicle 1 that is detected by the surrounding environment information detection means SA. As a result, the vehicle 1 of the embodiment can be kept in a traffic lane, without departing therefrom. Furthermore, when the driver over-steers the steering wheel 9, the over-steering can be inhibited and the vehicle can be driven in a stable attitude.

As shown in FIG. 2, the processing unit 20P includes an operation prediction unit 21 that is an operation prediction means, a travel trajectory generation unit 22 that is a travel trajectory generation means, a travel function control unit 23 that is a travel function control means, and a control condition determination unit 24. These units implement the driving assistance method of the embodiment. The driving assistance method of the embodiment can be implemented by at least the operation prediction unit 21, travel trajectory generation unit 22, and travel function control unit 23. The operation prediction unit 21, travel trajectory generation unit 22, travel function control unit 23, and control condition determination unit 24 are configured to exchange control data therebetween and output commands to each other.

The operation prediction unit 21 predicts the operation (driving operation) of the operation means (steering wheel 9, brake pedal 8P, and the like) of the vehicle 1 that will be performed by the driver from musculoskeletal state information of the driver of the vehicle 1 before the operation, that is, before the driving operation is performed by the driver. The travel trajectory generation unit 22 generates a travel trajectory (target travel trajectory) that is the target trajectory for the vehicle 1 when the vehicle 1 driven by the driver travels. The travel function control unit 23 controls the travel functions of the vehicle 1 at least on the basis of results obtained in adjusting the target travel trajectory generated by the travel trajectory generation unit 22 and the actual driving operation by the driver. In this case, the travel functions of the vehicle 1 are functions necessary for the vehicle 1 to travel and include, for example, the functions of accelerating, traveling at a constant speed, decelerating, stopping, and cornering. The control condition determination unit 24 determines the control branch conditions when the driving assistance device 20 implements the driving assistance method of the embodiment.

For example, when the vehicle 1 is provided with a traction control system, a vehicle stability control (VSC) system, or a vehicle dynamics integrated management (VDIM: active steering integration control) system, the control of the steering assist device 7 and brake actuator 8 may be executed by using control of these systems.

The storage unit 16 stores a computer program and a database used for controlling the vehicle 1 and also a computer program and a database including a processing procedure of the driving assistance method of the embodiment. Information necessary to predict the driver's operations, for example, constraints of joint (range of joint motion) of a human body and balance of muscles (bending and stretching intensity for each joint), and information necessary for the vehicle 1 to travel, for example, road information such as a straight road, curves, an ascending and descending road, and a high-speed road serve as a database to be used in the driving assistance method of the embodiment.

For example, a human body musculoskeletal state information database 16a can be a database to be used in the driving assistance method of the embodiment. The human body musculoskeletal state information database 16a is used to predict whether the operation means of the vehicle 1 are operated by the driver on the basis of musculoskeletal state information of the driver of the vehicle 1 that has been acquired by the processing unit 20P. The human body musculoskeletal state information database 16a is human body musculoskeletal state information that includes at least range-of-motion constraints of limb portions determined based on the range of joint motion of the driver, and range-of-motion constraints of body below the head. The human body musculoskeletal state information database 16a of the embodiment has the human body musculoskeletal state information including musculoskeletal data relating to constraints of body joints (determined by ranges of joint motion) and balance of muscles (bending and stretching intensity for each joint). Further, the human body musculoskeletal state information database 16a includes an elbow joint range-of-motion constraint determined on the basis of the range of elbow joint motion of the driver, and also knee joint and foot joint range-of-motion constraints as the range-of-motion constraints. The foot joint range-of-motion constraint as referred to herein is a range-of-motion constraint determined based on the range of motion of at least one foot joint from among the hip joints.

The storage unit 16 can be constituted by a non-volatile memory such as a read only memory (ROM), a volatile memory such as a random access memory (RAM), or a combination thereof. The processing procedure of the driving assistance method of the embodiment may be implemented by combining the aforementioned computer program with a computer program that has already been provided in the driving assistance device 20. The driving assistance method of the embodiment may be also implemented by configuring the driving assistance device 20 by using special hardware instead of the aforementioned computer program. The driving assistance method of the embodiment will be explained below. The driving assistance method of the embodiment can be implemented with the driving assistance device 20 shown in FIG. 2.

Figure 3:
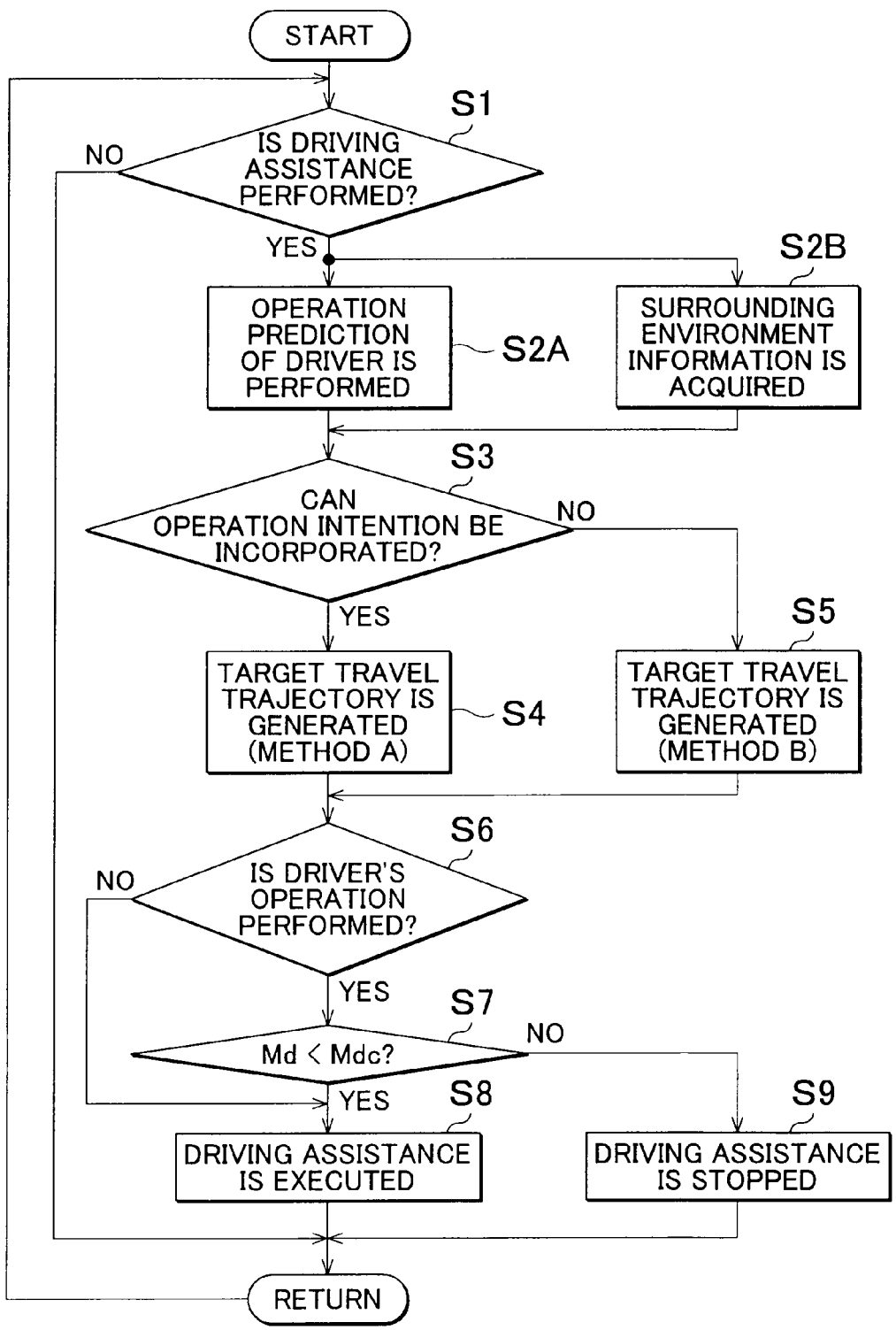
FIG. 3 is a flowchart showing a procedure of the driving assistance method of the embodiment.
Figure 4:
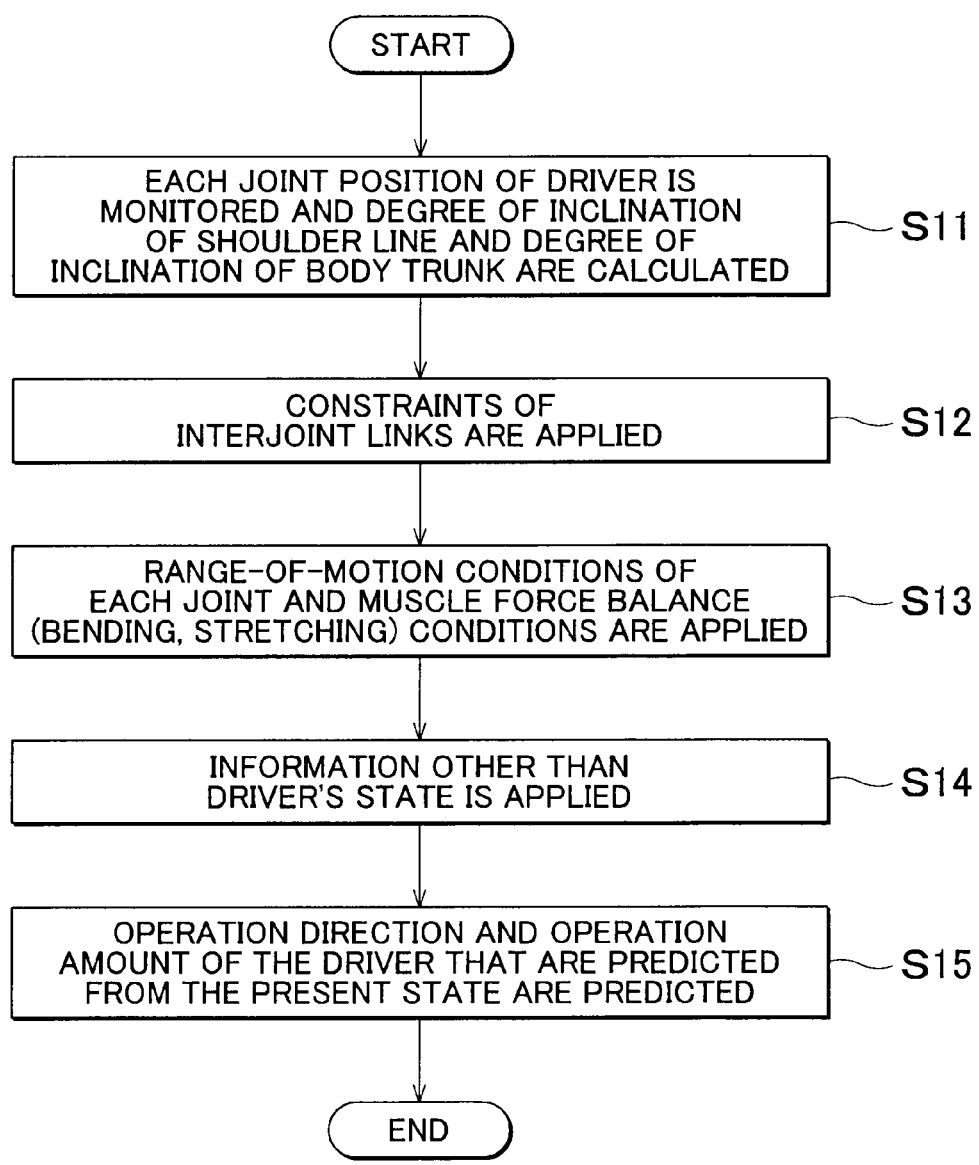
FIG. 4 is a flowchart showing a procedure of predicting a steering operation of the driver in the embodiment.
Figure 5:
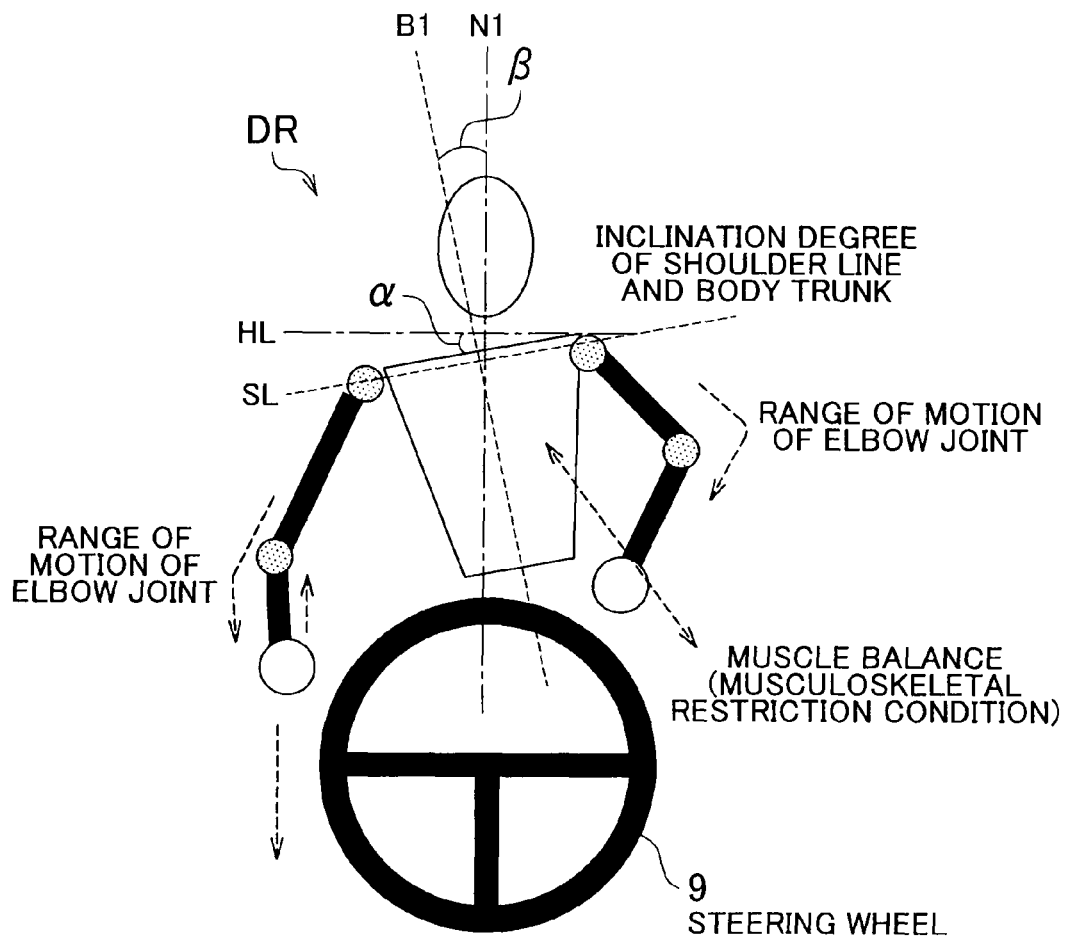
FIG. 5 is an explanatory drawing illustrating a method of predicting a steering operation of the driver in the embodiment.
Figure 6:
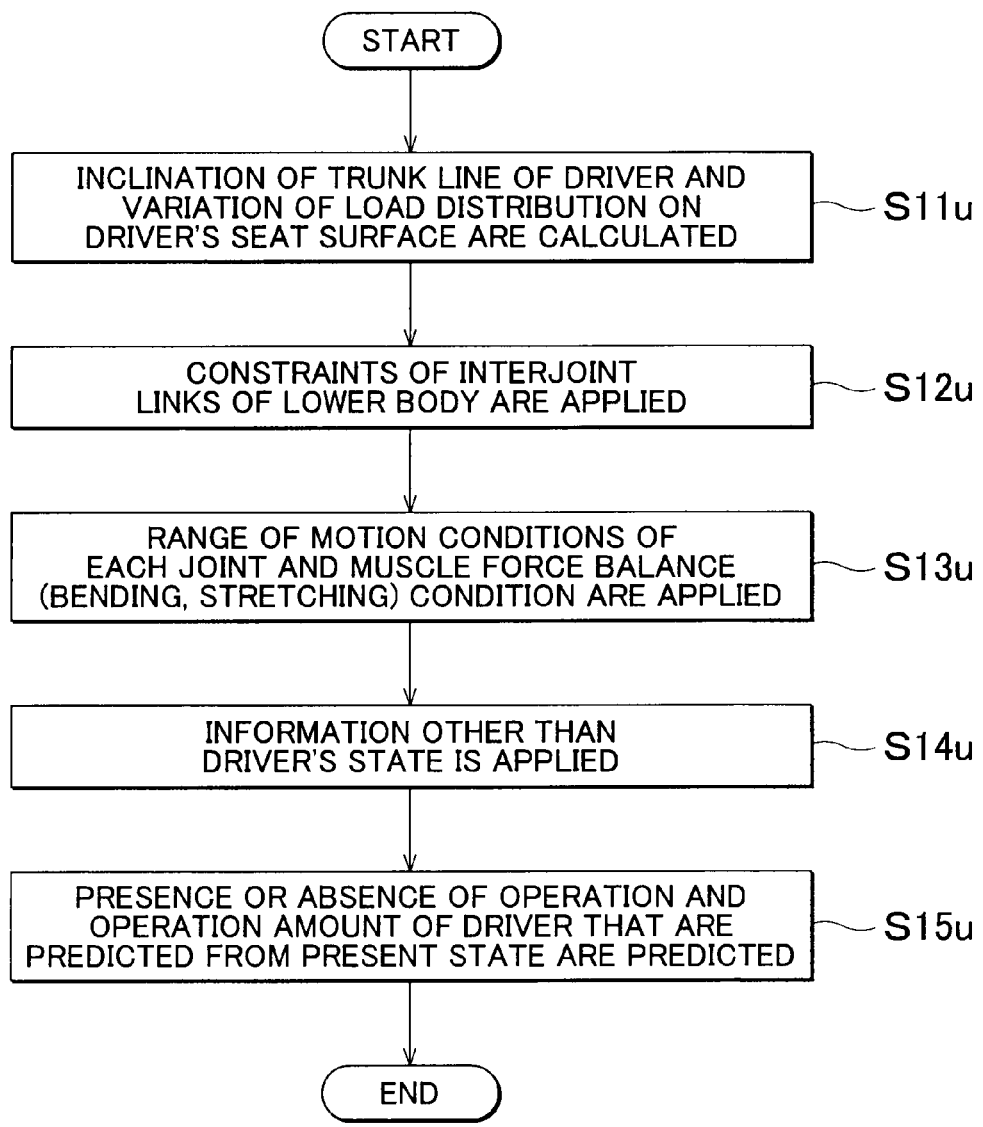
FIG. 6 is a flowchart illustrating the procedure of predicting a braking operation of the driver in the embodiment.
Figure 7A:
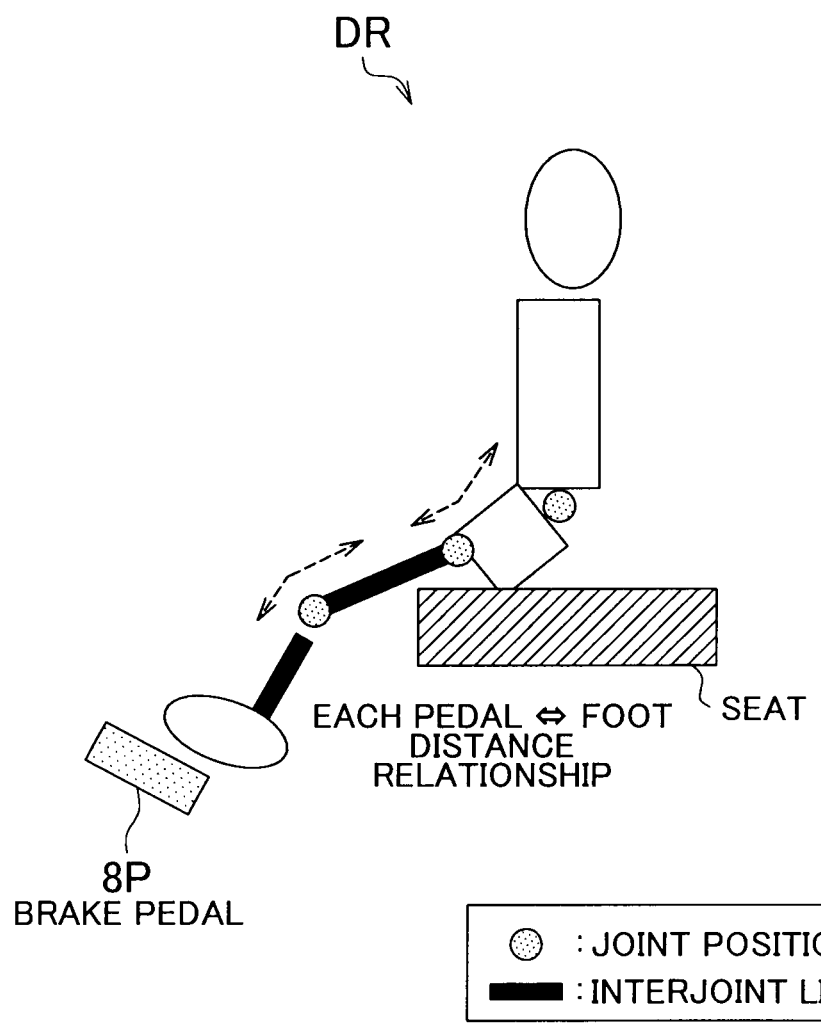
FIG. 7A is an explanatory drawings illustrating a method of predicting a braking operation of the driver in the embodiment.
Figure 7B:
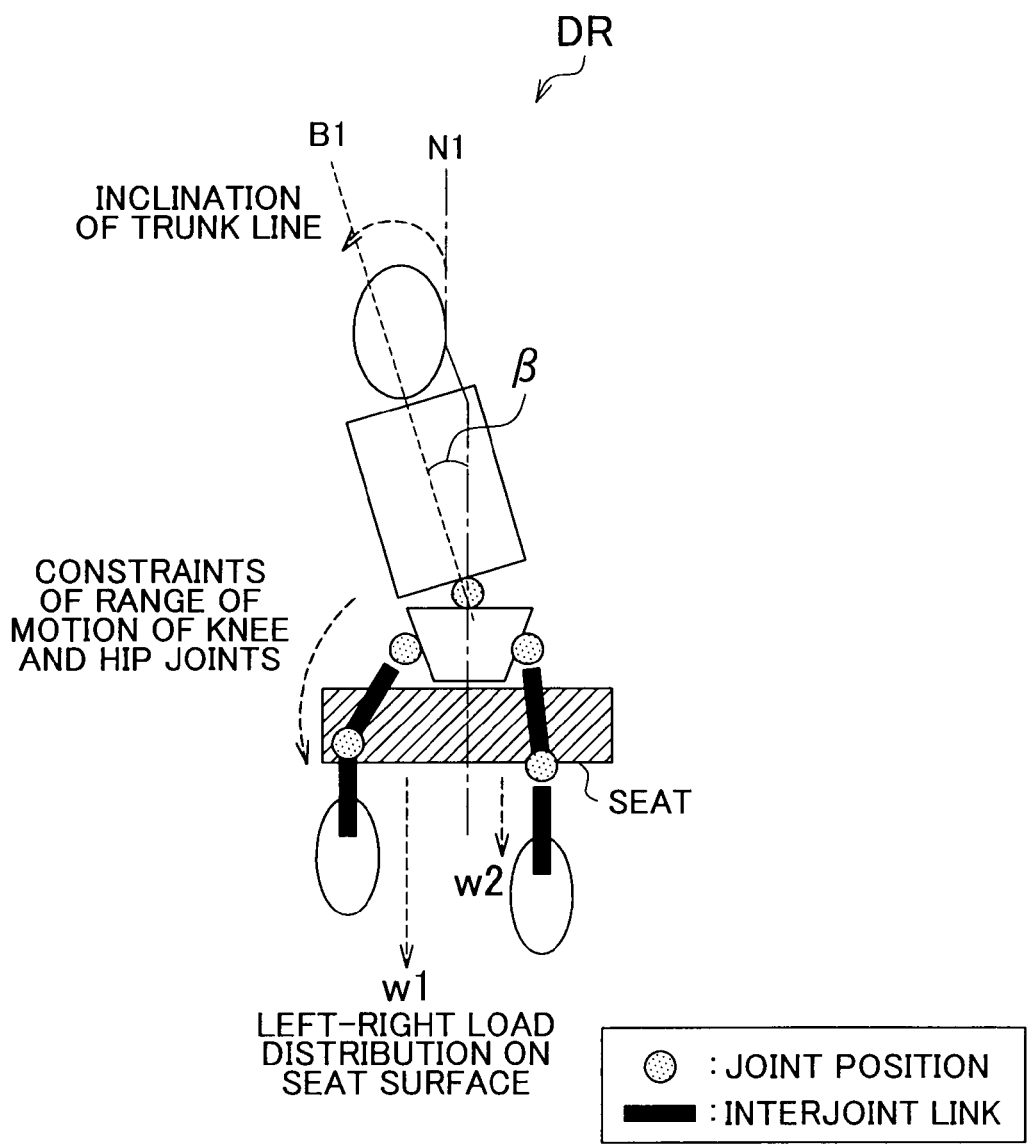
FIG. 7B is an explanatory drawings illustrating a method of predicting a braking operation of the driver in the embodiment.

FIG. 3 is a flowchart showing a procedure of the driving assistance method of the embodiment. FIG. 4 is a flowchart showing a procedure of predicting a steering operation of the driver in the embodiment. FIG. 5 is an explanatory drawing illustrating a method of predicting a steering operation of the driver in the embodiment. FIG. 6 is a flowchart illustrating the procedure of predicting a braking operation of the driver in the embodiment. FIGS. 7A and 7B are explanatory drawings illustrating a method of predicting a braking operation of the driver in the embodiment.

The driving assistance for the vehicle 1 may be executed at all times as the vehicle 1 travels, but in the embodiment, the driving assistance is not executed when the driver determines it to be unnecessary and when the driver's operation has a priority. Therefore, when the driving assistance method of the embodiment is implemented, in step S1, the control condition determination unit 24 of the driving assistance device 20 determines whether a condition in which the driving assistance will be executed is satisfied. When the control condition determination unit 24 determines in step S1 that the condition in which the driving assistance will be executed is not satisfied (step S1: No), the processing flow returns to START, and the control condition determination unit 24 executes the determination of step S1.

When the control condition determination unit 24 determines in step S1 that the condition in which the driving assistance will be executed is satisfied (step S1: Yes), the operation prediction unit 21 of the driving assistance device 20 predicts the operation of the driver of the vehicle 1 in step S2A and acquires the surrounding environment information of the vehicle 1 from the surrounding environment information detection means SA in step S2B. The order of steps S2A and S2B in this case is unimportant and the two steps may be executed at the same time.

The surrounding environment information acquired in step S2B is used to determine in the next step S3 whether the operation intention of the driver is incorporated in the driving assistance executed by the driving assistance device 20. The surrounding environment information includes, for example, the distance between the vehicle 1 and another vehicle or an obstacle present in front or diagonally in front in the traveling direction of the vehicle 1 that is detected by the traveling direction information detection sensor 43, and the road alignments, curvature, and gradient of the road on which the vehicle 1 travels. When a rear monitor or front side monitor is provided as the surrounding environment information detection means SA, the distance between the vehicle 1 and a vehicle traveling in the next lane or behind the vehicle 1 will be included in the surrounding environment information.

A method by which the operation prediction unit 21 predicts the operation of the driver of the vehicle 1 (operation prediction method) in step S2A will be explained below with reference to FIGS. 4 to 7B. First, a method for predicting a steering operation of the driver (steering operation prediction method) will be explained with reference to FIGS. 4 and 5. In the driving assistance method of the embodiment, whether the operation of the steering wheel 9 is performed by the driver DR and the operation amount of the steering wheel 9 are predicted on the basis of the musculoskeletal state information of the driver DR of the vehicle 1 that has been acquired by the driver state detection means SD.

First, in step S11, the operation prediction unit 21 acquires the present state of the driver DR. For example, the operation prediction unit 21 acquires the position of each joint of the driver DR and the length of interjoint links of the driver DR as musculoskeletal state information of the driver DR from the image information of the driver picked up by the upper body state detection camera 41. Then, the operation prediction unit 21 calculates an inclination degree of a shoulder line SL of the driver DR (an angle $\alpha$ at which the shoulder line SL is inclined with respect to a horizontal line HL) and an inclination degree of the body trunk (an angle $\beta$ at which the trunk line B1 is inclined with respect to a vertical line N1) that are shown in FIG. 5 on the basis of the obtained musculoskeletal information.

Then, in step S12, the operation prediction unit 21 applies the constraints of the interjoint links in the upper body of the driver DR shown in FIG. 5 to predict a steering operation. In a human body, the interjoint links are skeletons and muscles. When limbs move, the length and cross-section area of muscles change, but the length and cross-section area of skeleton do not change. Therefore, the operation direction and operation amount of the steering wheel 9 are predicted according to the constraints of the interjoint links which the length and cross-section area of interjoint links do not change.

Then, in step S13, the operation prediction unit 21 applies the range-of-motion conditions for each joint (elbow joint, shoulder joint, wrist joint, and the like) of the driver DR shown in FIG. 5 and muscle force balance (bending, stretching) conditions to predict a steering operation. For this purpose, the operation prediction unit 21 acquires the range-of-motion constraints of the joints necessary to predict the operation direction and operation amount of the steering wheel 9, such as the elbow joint, shoulder joint, and wrist joint, and also a muscle force balance around the respective joints from the human body musculoskeletal state information database 16a stored in the storage unit 16. Joints in the human body cannot move in all directions, and the movement directions and movement ranges are determined and cannot be exceeded. Therefore, there are constraints determined by the range of motion of human body joints for each joint (for example, elbow joint and shoulder joint) or interjoint links of the driver DR shown in FIG. 5. Because the range of motion of human body joints differs among individuals, the range-of-motion constraints are set by assuming an average human body and the set conditions are recorded in the human body musculoskeletal state information database 16a.

Then, in step S14, the operation prediction unit 21 applies information other than the state of the driver DR, for example, the surrounding environment information acquired by the surrounding environment information detection means SA and information relating to a state of the vehicle 1 that has been acquired by the host vehicle state detection means SC to the prediction of the steering operation. For this purpose, the operation prediction unit 21 acquires information relating to the vehicle 1, a mutual arrangement with surrounding vehicle (azimuth and distance between the vehicle 1 and the surrounding vehicles), the road alignments or curvature radius of the road where the vehicle 1 travels, or the travel speed of the vehicle 1 from the surrounding environment information detection means SA and host vehicle state detection means SC.

In step S15, the operation prediction unit 21 uses the information acquired in the above-described procedure to predict the operation direction and operation amount of the steering wheel 9. In a case where the driver DR is to operate the operation means (for example, the steering wheel 9) of the vehicle 1, the indications of this operation occur in musculoskeletal state information of the driver DR. In the driving assistance method of the embodiment, the indications of the operation to be performed by the driver DR on the operation means of the vehicle 1 are detected and the direction of the operation and operation amount are predicted by acquiring the musculoskeletal state information of the driver DR. The indications of the operation to be performed by the driver DR on the operation means of the vehicle 1 may be detected and the direction of the operation and operation amount may be predicted by using the movement of the line of sight of the driver or both the musculoskeletal state information and the movement of the line of sight.

For example, in a case where the driver DR is to operate the steering wheel 9, the indications thereof occur, for example, in the inclination of shoulders and body trunk. In this case, it is assumed that the steering wheel 9 will be operated in the direction in which the shoulders and body trunk are inclined and that the operation amount of the steering wheel 9 will increase with the increase in inclination of the shoulders and body trunk. Therefore, the operation prediction unit 21 predicts the operation direction and operation amount of the steering wheel 9 from the degree of inclination of shoulder line SL and degree of inclination of the body trunk of the driver DR that are calculated in step S11.

For example, in a case where the shoulder line SL of the driver DR obliquely extends downward from the left arm side to the right arm side of the driver DR, the operation prediction unit 21 predicts that the steering direction of the steering wheel 9 will be to the left. Further, the relationship between the inclination angle $\alpha$ of the shoulder line SL with respect to the horizontal line HL and the operation amount of the steering wheel 9, and the relationship between the inclination angle $\beta$ of the body trunk line B1 with respect to the vertical line N1 and the operation amount of the steering wheel 9 are determined from a test or simulation and stored in the storage unit 16, and the operation amount of the steering wheel 9 is predicted by the operation prediction unit 21 from the inclination angle α or β that has been calculated. More specifically, the operation prediction unit 21 calculates the movable direction and movable amount of palm position of the driver DR on the basis of the musculoskeletal state information of the driver DR and predicts the operation direction and operation amount of the steering wheel 9 by the driver DR that are predicted from the present state.

In this case, the operation prediction unit 21 takes into account the constraints of interjoint links that has been acquired in step S12, range-of-motion constraints of elbow joint, shoulder joint, and wrist joint, and muscle force balance around each of these joint that have been acquired in step S13, and information other that the state of the driver DR that has been acquired in step S14. Thus, the operation prediction unit 21 predicts the operation direction and operation amount of the steering wheel 9 from the musculoskeletal state information of the driver DR so that the constraints of the interjoint links are satisfied and so that motions of each joint of the driver DR are confined within a range of respective range of motion acquired in step S13. Thus, in the embodiment, the operation direction and operation amount of the steering wheel 9 is predicted by using the range-of-motion constraints of limbs (a body part that relates to the driving operation) that are determined based on the ranges of motion of joints of the human body as constraints. Therefore, the prediction can be made with higher accuracy.

When a steering operation of the driver DR is predicted, it is preferred that at least the range-of-motion constraints of arms that are determined based on the range of motion of the elbow joint be taken into account. This is because the range of motion of the elbow joint is more important that the range of motion of other joints in the operation of the steering wheel 9 and, therefore, where the range of motion of the elbow joint is taken into account, a certain prediction accuracy can be ensured. Further, where only the range-of-motion constraints of arms that are determined based on the range of motion of the elbow joint are taken into account, constraints for other joints need not be taken into account. Therefore, the processing load of the operation prediction unit 21 is reduced.

In a case where it is determined based on the information other than that relating to the state of the driver DR that, for example, the vehicle 1 may travel outside a traffic lane or interfere with a vehicle that travels in an adjacent lane as a result of the operation of the steering wheel 9 in the predicted operation direction, the predicted operation direction is improper. Further, in a case where the behavior of the vehicle 1 may become unstable as a result of the operation of the steering wheel 9 by the predicted operation amount, the predicted operation amount is also improper. Therefore, in such cases, the operation prediction unit 21 again acquires the present state of the driver DR and repeats the prediction. Thus, in the embodiment, when the operation direction or operation amount of the steering wheel 9 is predicted, information other than that relating to the state of the driver DR, for example, surrounding environment information and information relating to the state of the vehicle 1, is taken into account and therefore the prediction can be made with higher accuracy.

With reference to FIG. 6, FIG. 7A and FIG. 7B, a method for predicting a braking operation of the driver (braking operation prediction method) will be explained below. In the driving assistance method of the embodiment, whether the braking operation is performed by the driver DR and the operation amount of the brake (operation amount of the brake pedal 8P) are predicted on the basis of the musculoskeletal state information of the driver DR of the vehicle 1 that has been acquired by the driver state detection means SD.

First, in step S11u, the operation prediction unit 21 acquires the present state of the driver DR. For example, the operation prediction unit 21 acquires the position of each joint of the driver DR and the length of interjoint links of the driver DR as musculoskeletal state information of the driver DR from the image information of the driver picked up by the lower body state detection camera 42. Then, the operation prediction unit 21 calculates the inclination of the trunk line B1 of the driver DR (angle β at which the trunk line B1 is inclined with respect to a vertical line N1) and the variation of distribution of load w (load distribution) in the bearing surface of the seat where the driver DR sits that are shown in FIG. 7B on the basis of the obtained musculoskeletal information.

Then, in step S12u, the operation prediction unit 21 applies the constraints of the interjoint links in the lower body of the driver DR shown in FIGS. 7A and 7B to predict a braking operation. As described hereinabove with reference to the constraints of interjoint links, then, in step S13u, the operation prediction unit 21 applies the range-of-motion conditions for each joint (hip joint, knee joint, ankle joint, and the like) of the driver DR shown in FIGS. 7A and 7B and muscle force balance (bending, stretching) conditions to predict a braking operation. For this purpose, the operation prediction unit 21 acquires the range-of-motion constraints of the joints necessary to predict the presence or absence of the operation and the operation amount of the brake pedal 8P, such as the hip joint, knee joint, and ankle joint, and also a muscle force balance around the respective joints from the human body musculoskeletal state information database 16a stored in the storage unit 16. The range-of-motion constraints of the joints of the lower body are similar to the range-of-motion constraints of the joints of the upper body. As for the range-of-motion constraints of the joints of the lower body, the range-of-motion constraints assuming an average human body are recorded in the human body musculoskeletal state information database 16a.

Then, in step S14u, the operation prediction unit 21 applies information other than the state of the driver DR to predict the braking operation. Step S14u is similar to the above-described step S14. In step S15u, the operation prediction unit 21 uses the information acquired in the above-described procedure to predict the presence or absence of a braking operation and the operation amount thereof.

For example, in a case where the driver DR is to operate the brake pedal 8P, the driver moves the foot to the position of the brake pedal 8P. The indications of this movement occur in a hip joint, a knee joint, and a ankle joint, namely, an foot joint, and a distribution of load over the seat surface. For example, when the operation prediction unit 21 detects an operation such that twists an ankle toward the brake pedal 8P about a heel as a fulcrum or detects changes in the load distribution such that a load w1 on the right side of the seat surface becomes less than before, the operation prediction unit 21 can predict that a braking operation is to be performed. Further, when the heel is not lifted off the floor of the vehicle 1, the relative braking force is small, and when the heel is lifted off the floor of the vehicle 1, the relative braking force tends to increase. Therefore, the operation amount of a braking operation can be predicted based on whether the heel is lifted off the floor of the vehicle 1. For example, when the operation prediction unit 21 predicts that a braking operation will be performed and the heel of the driver DR is lifted off the floor, a relatively larger braking force is predicted, and when the heel of the driver DR is not lifted off the floor, a relatively small braking force is predicted.

In this case, the operation prediction unit 21 takes into account the constraints of interjoint links that has been acquired in step S12u, range-of-motion constraints of hip joint, knee joint, and ankle joint, and muscle force balance around each of these joints that have been acquired in step S13u, and information other that the state of the driver DR that has been acquired in step S14u. Thus, the operation prediction unit 21 predicts the presence or absence of braking operation and the operation amount thereof from the musculoskeletal state information of the driver DR so that the constraints of the interjoint links are satisfied and so that motions of each joint of the driver DR are confined within a range of respective range of motion acquired in step S13u. Thus, in the embodiment, presence or absence of braking operation and the operation amount thereof are predicted by taking the range-of-motion constraints of limbs (a body part that relates to the driving operation) that are determined based on the ranges of motion of joints of the human body as constraints. Therefore, the prediction can be made with higher accuracy.

When a braking operation of the driver DR is predicted, it is preferred that at least the range-of-motion constraints of a leg that are determined based on the range of motion of the knee joint and hip joint be taken into account. This is because the ranges of motion of the knee joint and hip joint are more important than the range of motion of other joints in the operation of the brake pedal 8P and, therefore, where theses ranges of motion are taken into account, a certain prediction accuracy can be ensured. Further, where only the range-of-motion constraints of legs that are determined based on the ranges of motion of the knee joint and hip joint are taken into account, constraints for other joints need not be taken into account. Therefore, the processing load of the operation prediction unit 21 is reduced.

In a case where it is determined based on the information other than the state of the driver DR that, for example, the predicted braking amount is too small and that the host vehicle may come too close to the vehicle traveling in front, the predicted operation amount is improper. Therefore, in such case the operation prediction unit 21 again acquires the present state of the driver DR and repeats the prediction. Thus, in the embodiment, when the presence or absence of a braking operation and the operation amount thereof are predicted, information other than that relating to the state of the driver DR, for example, surrounding environment information and information relating to the state of the vehicle 1, is taken into account and therefore the prediction can be made with higher accuracy.

Once the operation of the driver has been predicted in step S2A and the surrounding environment information has been acquired in step S2B, the processing flow advances to step S3. In step S3, the control condition determination unit 24 of the driving assistance device 20 determines whether the predicted operation intention for the driver is incorporated in the driving assistance executed by the driving assistance device 20. With the driving assistance method of the embodiment, the operations of the driver of the vehicle 1 are predicted, but in some cases the surrounding environment of the vehicle 1 may not be suitable for incorporating the predicted operation of the driver in the driving assistance executed by the driving assistance device 20. For example, where it is predicted that the driver operates the steering wheel 9, when no road is present in the predicted operation direction or an obstacle is present therein, it is undesirable to incorporate the operation of the steering wheel 9 in the predicted operation direction in the driving assistance executed by the driving assistance device 20.

Accordingly, in step S3, it is determined whether the predicted operation intention of the driver can be incorporated in the driving assistance executed by the driving assistance device 20. Where all the following determination conditions (1), (2), and (3) are satisfied, it is determined that the predicted operation intention of the driver can be incorporated in the driving assistance executed by the driving assistance device 20. In the embodiment, this determination is executed at least when the steering operation by the driver has been predicted.

(1) The driver intends to operate an operation means (steering wheel 9) of the vehicle 1.

(2) A road alignment where the vehicle 1 is to travel, from among the surrounding environment information detected by the surrounding environment information detection means SA, matches the operation direction of the steering wheel 9 predicted in step S2A.

(3) It is determined that no other vehicle or obstacle is present in the operation direction of the steering wheel 9 predicted in step S2A, based on the surrounding environment information detected by the surrounding environment information detection means SA.

The condition (1) is satisfied when it is predicted in step S2A that the driver operates the operation means of the vehicle 1. The condition (2) is satisfied, for example, when the operation direction of the steering wheel 9 predicted in step S2A is to the left and when the road alignment along which the vehicle 1 will travel from now on is a leftward curve or another traffic lane is present in the left side of the vehicle 1. The condition (3) is satisfied, for example, when the operation direction of the steering wheel 9 predicted in step S2A is to the left and when no other vehicle or obstacle is present on the left side at a predetermined distance (for example, 10 m) from the position where the vehicle 1 is present. By executing the determination in step S3, it is possible to ensure sufficient safety when the predicted operation intention of the driver is incorporated in the driving assistance executed by the driving assistance device 20.

In a case where all the above-described conditions (1) to (3) are satisfied, the control condition determination unit 24 determines that the predicted operation intention of the driver can be incorporated in the driving assistance executed by the driving assistance device 20. In this case, the processing flow advances to step S4 and the travel trajectory generation unit 22 of the driving assistance device 20 generates a target travel trajectory that is a target for the vehicle 1. A method for generating the target travel trajectory in step S4 will be referred to as a target travel trajectory generation method A. In a case where at least one of the above-described conditions (1) to (3) is not satisfied, the control condition determination unit 24 determines that the predicted operation intention of the driver can not be incorporated in the driving assistance performed by the driving assistance device 20. In this case, the processing flow advances to step S5 and the travel trajectory generation unit 22 of the driving assistance device 20 generates a target travel trajectory that is a target for the vehicle 1. A method for generating the target travel trajectory in step S5 will be referred to as a target travel trajectory generation method B. The travel trajectory generation method A will be explained below.

Figure 9:
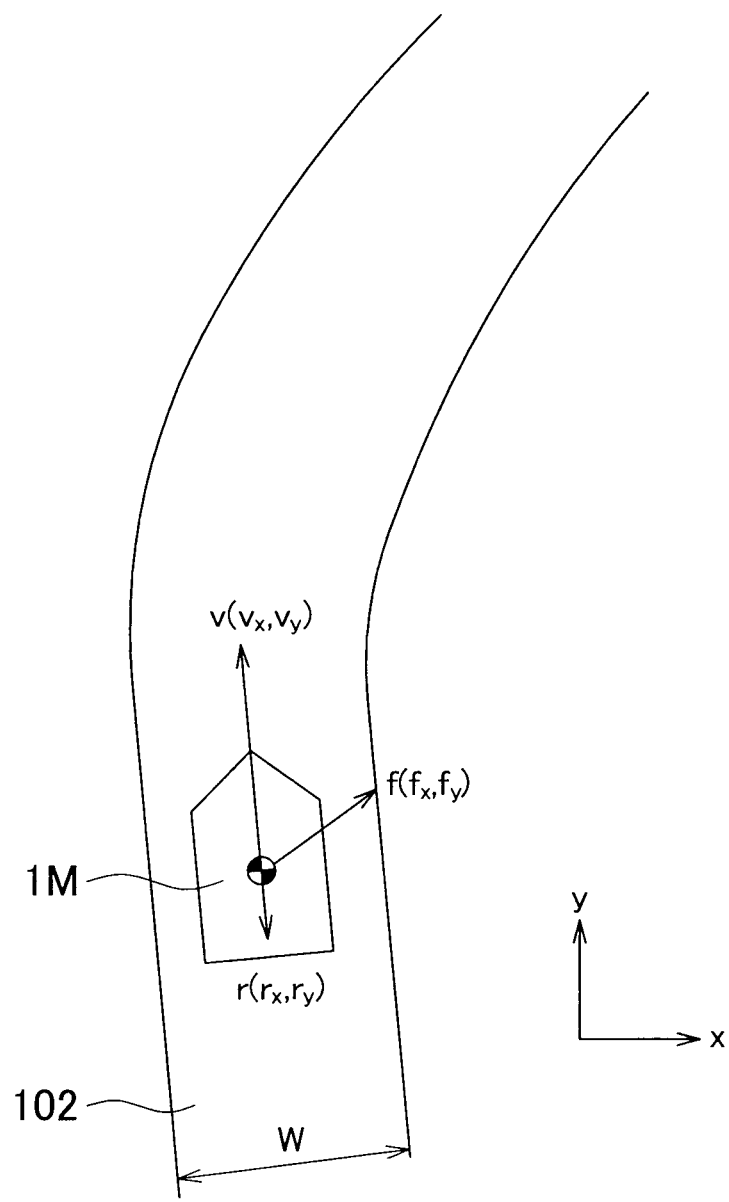
FIG. 9 illustrates a method for generating a first travel trajectory in the target travel trajectory generation method A.
Figure 10:
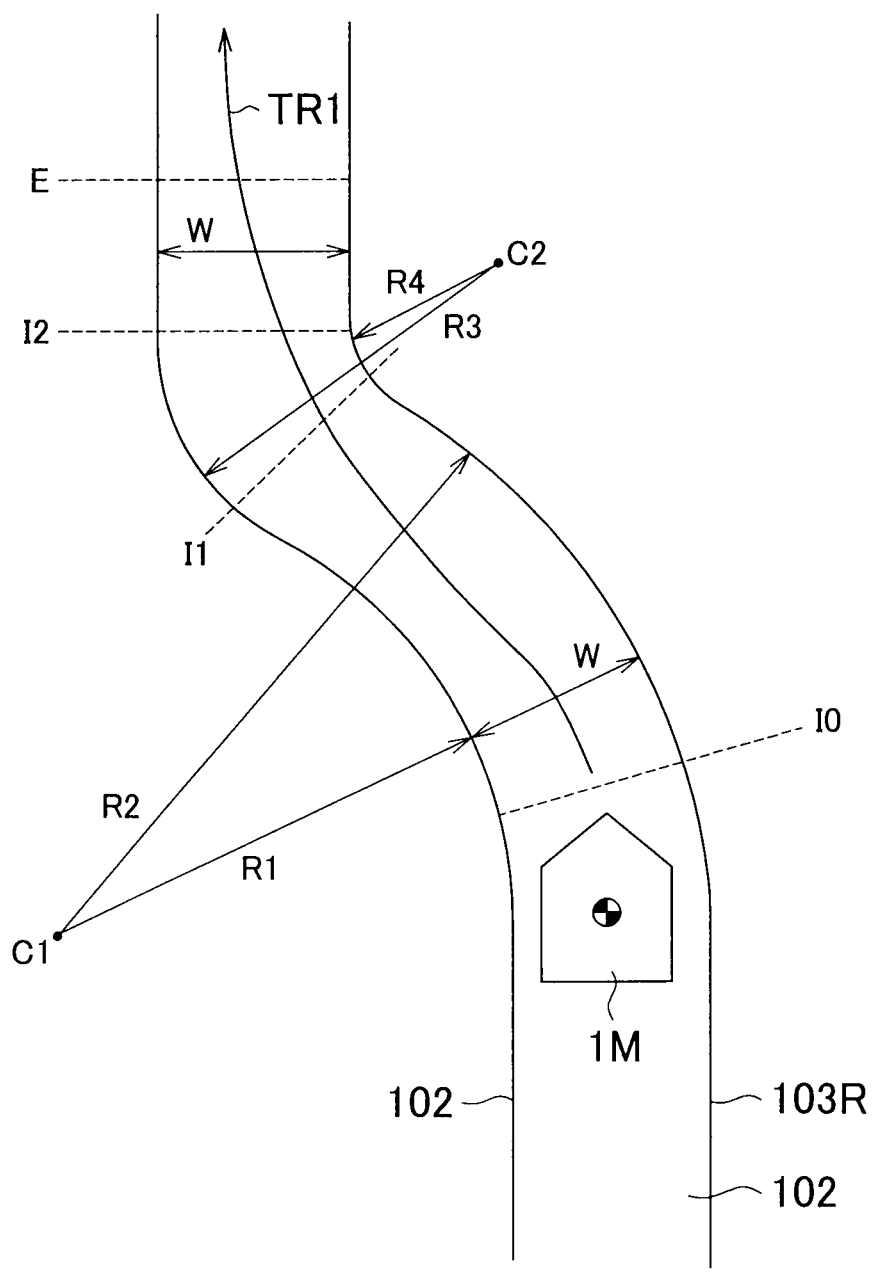
FIG. 10 illustrates a method for generating a first travel trajectory in the target travel trajectory generation method A.
Figure 11:
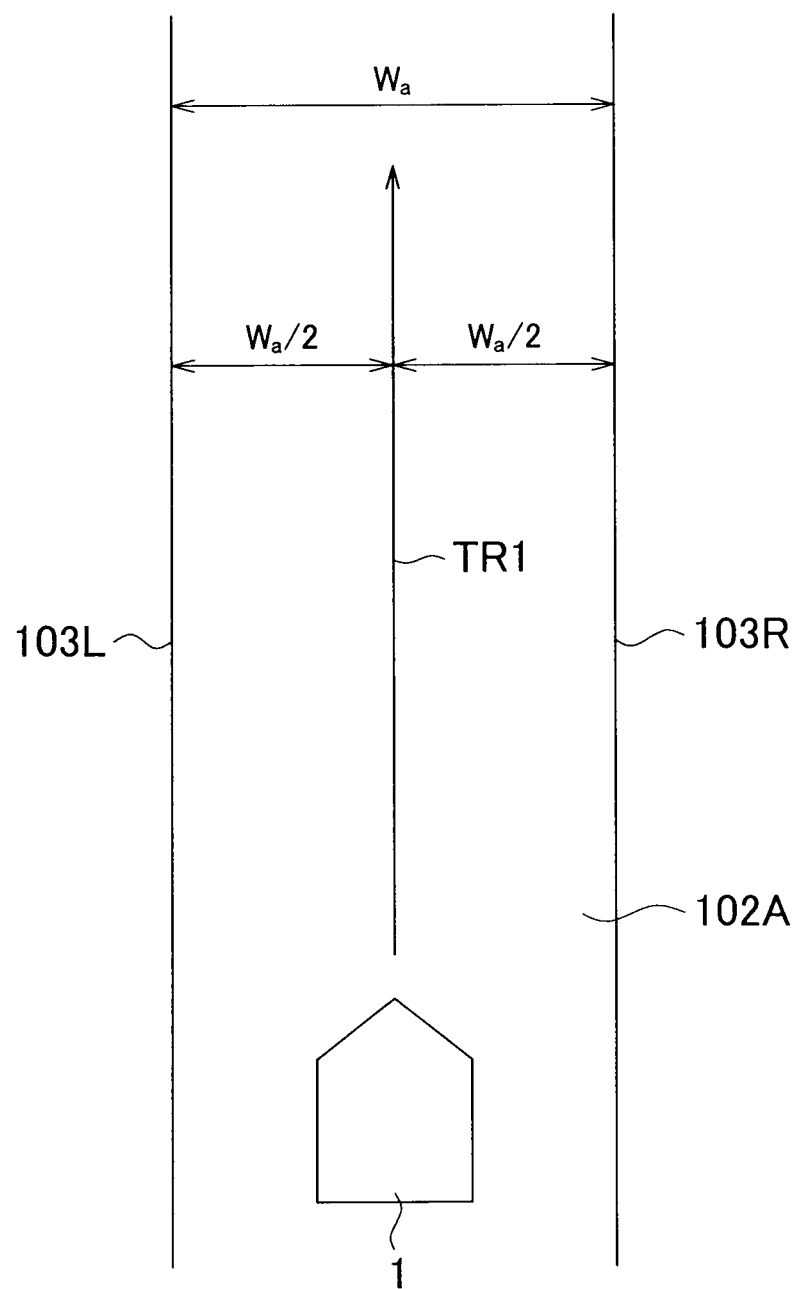
FIG. 11 illustrates a method for generating a first travel trajectory in the target travel trajectory generation method A.
Figure 12:
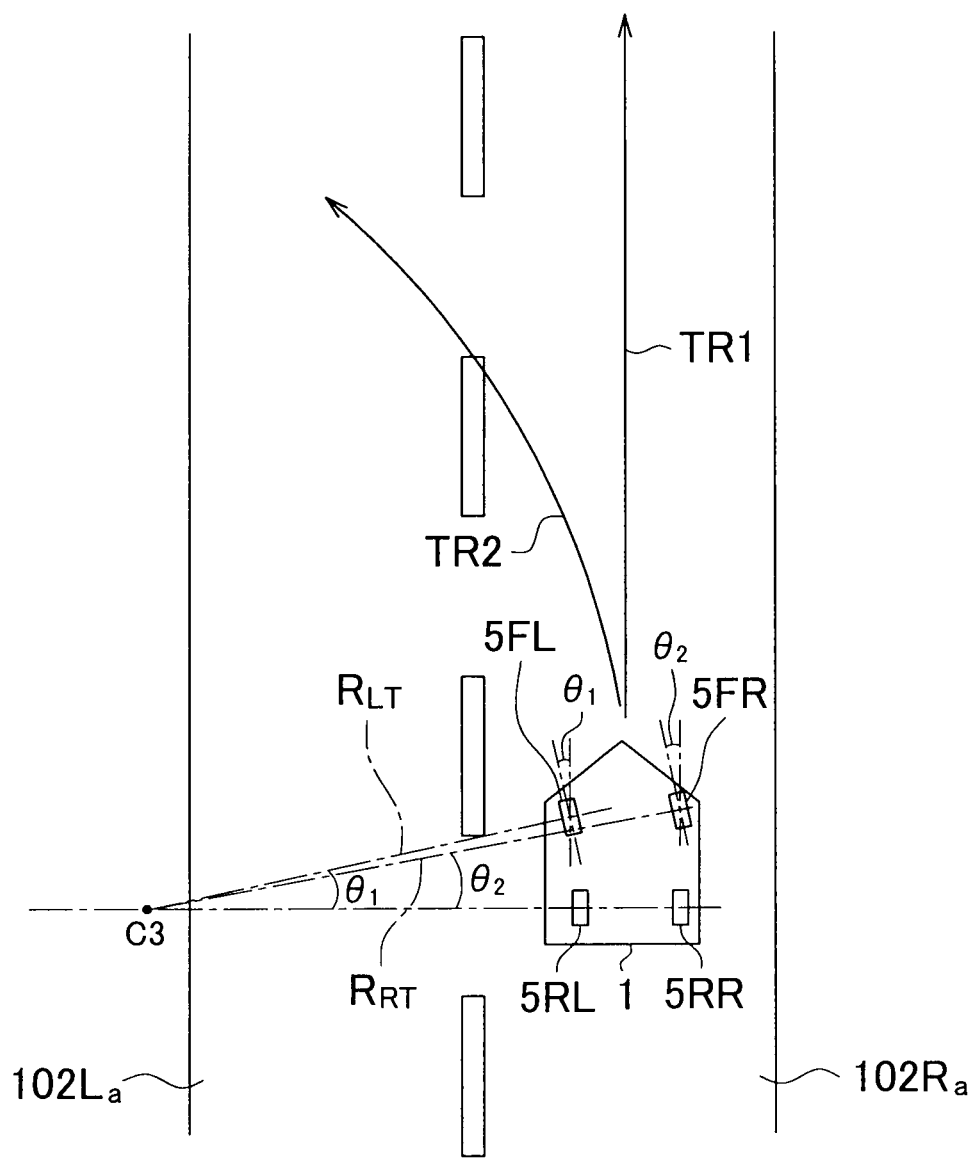
FIG. 12 illustrates a method for generating a second travel trajectory in the target travel trajectory generation method A.

FIG. 8 is a flowchart illustrating the procedure of the travel trajectory generation method A. FIGS. 9 to 11 illustrate a method for generating a first travel trajectory in the travel trajectory generation method A. FIG. 12 illustrates a method for generating a second travel trajectory in the travel trajectory generation method A. In the travel trajectory generation method A, in step S41A, the travel trajectory generation unit 22 generates a first travel trajectory TR1 based on information relating to surrounding environment of the vehicle 1 (surrounding environment information). In step S41B, the travel trajectory generation unit 22 generates a second travel trajectory TR2 on based on a prediction result of a driving operation (in this case, an operation of the steering wheel 9) of the driver that has been predicted by the operation prediction unit 21. The order of step S41A and step S41B is unimportant and the two steps may be executed at the same time. Further, the first travel trajectory TR1 and the second travel trajectory TR2 are both the paths along which the vehicle 1 will travel and also include information relating to speed and acceleration. A method for generating the first travel trajectory TR1 will be described below.

The first travel trajectory TR1 is a travel trajectory of the vehicle 1 that is generated so as to be mathematically and mechanically optimized by using only the surrounding environment information of the vehicle 1, state parameters of the vehicle 1, and constraints of the vehicle 1 and surrounding environment thereof. The second travel trajectory TR2 is a travel trajectory of the vehicle 1 estimated from the operation direction and operation amount of the operation object (in this case, the steering wheel 9) predicted in step S2A. The surrounding environment information of the vehicle 1 is information relating to road alignment, curvature, and gradient of the road along which the vehicle 1 will travel. The state parameters of the vehicle 1 are physical parameters representing the present state of the vehicle 1, for example, the present travel speed, running resistance, mass, output of the internal combustion engine 2 of the vehicle 1, and a friction coefficient between the drive wheels and the road surface.

The first travel trajectory TR1 is generated, for example, by the below-described method. With this method, the first travel trajectory TR1 is generated by solving an optimization problem (referred to hereinbelow as an optimization method). For example, an optimization problem is solved by a nonlinear programming or sequential conjugate gradient restoration algorithm (SCGRA) and so forth, by setting an evaluation function (objective function) for prior characteristics of the vehicle 1 and by using a vehicle model which is a dynamic model of the vehicle 1. A travel trajectory of the vehicle 1 is thus obtained that maximizes or minimizes the evaluation function.

In this method, as shown in FIG. 9, a vehicle model 1M is a dynamic model of the vehicle 1 shown in FIG. 1. In the embodiment, the vehicle model 1M is mass point model. A friction coefficient μ between the drive wheels (front left wheel 5FL and front right wheel 5FR) of the vehicle 1 and road surface, an output P of the internal combustion engine 2, and a running resistance r are taken into account. The equation of motion of the vehicle model 1M is expressed in the x-y coordinate system by Formulas (A) to (D).

$$m \times x'' = f_x - r_x \quad (A)$$

$$m \times y'' = f_y - r_y \quad (B)$$

$$x' = v_x \quad (C)$$

$$y' = v_y \quad (D)$$

Here, x and y denote a position of the vehicle model 1M, m denotes a mass of the vehicle model 1M (corresponds to the mass of the vehicle 1), $f_x$ and $f_y$ denote tire forces generated by the tires of the vehicle model 1M, $r_x$ and $r_y$ denote a running resistance of the vehicle model 1M (corresponds to the running resistance of the vehicle 1), and $v_x$ and $v_y$ denote a speed of the vehicle model 1M. In a case where x and y are used as indexes for other symbols, x means a component in the x direction and y means a component in the y direction. The symbol (') means a time derivative, and the number of such symbols represents the order of derivative. Thus, x" and y" mean an acceleration in the x direction and an acceleration in the y direction, respectively.

A constraint for a tire force is expressed by Formula (E), a constraint for the output of the internal combustion engine 2 is expressed by Formula (F), and the running resistance is expressed by Formulas (G) and (H).

$$\sqrt{(f_x^2 + f_y^2)} \leq (\mu \times m_n) \quad (E)$$

$$f_x \times v_x + f_y \times v_y \leq P_{max} \quad (F)$$

$$r_x = (C_d \times v^2 + d_0) \times (v_x/v) \quad (G)$$

$$r_y = (C_d \times v^2 + d_0) \times (v_y/v) \quad (H)$$

Here, $m_n$ denotes a vertical load of the vehicle model 1M, $P_{max}$ denotes a maximum power of the internal combustion engine 2, $C_d$ denotes a drag coefficient, $d_0$ denotes a running resistance at v=0, and v is $\sqrt{(v_x^2 + v_y^2)}$.

Further, a modeled road 102 on which the vehicle model 1M travels is a region marked out with two lane markings 103L and 103R. A constraint to which the vehicle model travels within the road 102 is expressed by Formulas (I) and (J). Formula (I) corresponds to a curved road, and Formula (J) corresponds to a straight road.

$$R_i^2 \leq (x^2 + y^2) \leq R_o^2 \quad (I)$$

$$h_1 \leq x \leq h_2 \quad (J)$$

Here, $R_i$ denotes a radius of the lane marking positioned on the inner side of a curved road and is R1 in the segment from I0 to I1 and R4 in the segment from I1 to I2 in FIG. 10. $R_o$ denotes a radius of the lane marking positioned on the outer side of a curved road and is R2 in the segment from I0 to I1 and R3 in the segment from I1 to I2 in FIG. 10. Further, h1 is an x coordinate of one lane marking and h2 is an x coordinate of another lane marking in the straight road. Therefore, h2=h1+W. W is the width (road width) of the modeled road 102.

For example, when the vehicle model 1M travels in a predetermined segment (segment from I0 to E) of the road 102 such as shown in FIG. 10 and the load ratio of the drive tires is required to be minimized, then the sum Σf: (I0→E) of tire forces $f=\sqrt{(f_x^2 + f_y^2)}$ is set as an evaluation function F. A trajectory obtained by solving the optimization problem for minimizing this evaluation function F under the above-described constraints using the non-linear programming or SCGRA and so forth is the first travel trajectory. That is, the first travel trajectory is an assemblage of coordinates (x, y) at each time. State parameters of the vehicle model 1M at a point in time in which the vehicle model 1M enters the predetermined segment I0 are used as initial conditions. The coordinates (x, y) at each time are obtained by integrating the respective speed $v_x$ and $v_y$.

The evaluation function F is set based on a characteristic of the vehicle 1 that is required to be optimized. Then the optimization problem for maximizing or minimizing the evaluation function F is solved in accordance with the characteristics of the evaluation function F. The characteristic of the vehicle 1 that is required to be optimized is, for example, a fuel consumption ratio (minimum is the target) of the vehicle 1, the passage speed of the vehicle 1 in the predetermined segment (maximum is the target), and stability of the vehicle 1 (for example, a roll momentum is minimized). The characteristic that is required to be optimized may be set one in advance, or may be changed based on the travel conditions of the vehicle 1. For example, when the vehicle 1 travels in an economy travel mode, the travel trajectory generation unit 22 generates a travel trajectory such that minimizes the fuel consumption ratio of the vehicle 1 as the first travel trajectory TR1, and when the vehicle 1 travels in a sports travel mode, the travel trajectory generation unit 22 generates a travel trajectory such that maximizes the passage speed of the vehicle 1 in the predetermined segment as the first travel trajectory TR1. Thus, the travel trajectory generation unit 22 generates a travel trajectory that can optimize the set characteristic of the vehicle 1. With such an optimization method, it is possible to obtain a travel trajectory for which certain characteristic (for example, fuel consumption ratio or travel speed) of the vehicle 1 is optimized, result in high performance with respect to the optimized characteristic.

Another method (geometric method) for generating the first travel trajectory TR1 will be explained below with reference to FIG. 11. As shown in FIG. 11, the center of a road 102A on which the vehicle 1 travels may be set as the first travel trajectory TR1. Namely, the first travel trajectory TR1 is a trajectory obtained by calculating a plurality of coordinates of positions at a distance of $W_a/2$ from any of two lane markings 103L and 103R for marking out the road 102A, and then connecting the plurality of coordinates along the direction in which the road 102A extends. A road information, that is, the two lane markings 103L and 103R and the road width $W_a$, is detected by a camera using as an traveling direction information detection sensor 43 provided at the vehicle 1. Image obtained by the camera includes the information of the road in the traveling direction of the vehicle. The road information is obtained by implementing an image processing such as a filtering processing and an edge extraction processing with respect to the image. With the geometric method, the processing load of the driving assistance device 20 (ECU 10) constituted by a computer is less than that with the optimization method. Therefore, the first travel trajectory TR1 can be obtained rapidly and comparatively easily. An example of the method for generating the second travel trajectory TR2 in step S41B will be explained below with reference to FIG. 12.

As shown in FIG. 12, a case will be considered below in which the vehicle 1 changes lanes from a right lane $102R_a$ to a left lane $102L_a$. In this case, when the steer wheels of the vehicle 1, that is, the front left wheel 5FL and front right wheel 5FR are steered, the vehicle 1 turns about a crossing point C3 of a shaft of the front left wheel 5FL, a shaft of the front right wheel 5FR, and shafts of the rear left wheel 5RL and rear right wheel 5RR. When the second travel trajectory TR2 is generated, the travel trajectory generation unit 22 calculates the steering angles $\theta_1$ and $\theta_2$ of the steer wheels of the vehicle 1, that is, the front left wheel 5FL and front right wheel 5FR based on the operation amount of the steering wheel 9 by the driver that has been predicted in the above-described step S2A.

As shown in FIG. 12, when the vehicle 1 turns, the turn radius of the front left wheel 5FL is $R_{LT}$ and the turn radius of the front right wheel 5FR is $R_{RT}$. Therefore, the turn radius of the center of gravity of the vehicle 1 is $(R_{LT}+R_{RT})/2$. In this case, where the wheel base (distance between the front and rear wheel shafts) of the vehicle 1 is denoted by $L_W$, the turn radius $R_{LT}$ of the front left wheel 5FL is $L_W/\sin\theta_1$. The turn radius $R_{RT}$ of the front right wheel 5FR is $L_W/\sin\theta_2$. In the embodiment, the travel trajectory generation unit 22 calculates the turn radius $(R_{LT}+R_{RT})/2$ of the center of gravity of the vehicle and generates the trajectory thereof as the second travel trajectory TR2. The turn radius of the center of gravity of the vehicle may be corrected by taking into account the turn characteristic of the vehicle 1.

Once the first travel trajectory TR1 and second travel trajectory TR2 have been generated in step S41A and step S41B, the processing flow advances to step S42. In step S42, the control condition determination unit 24 determines whether the first travel trajectory TR1 matches the second travel trajectory TR2. As a result, it is determined whether the operation intention of the driver matches the first travel trajectory TR1 obtained based on the surrounding environment information of the vehicle 1 and state parameters of the vehicle 1. Where the operation intention of the driver matches the first travel trajectory TR1, the driving assistance device 20 executes the driving assistance on the basis of the first travel trajectory TR1. By contrast, where the operation intention of the driver does not match the first travel trajectory TR1, the driving assistance device 20 generates a travel trajectory by taking into account the operation intention of the driver and performs the driving assistance on the basis thereof.

After the control condition determination unit 24 has determined that the first travel trajectory TR1 matches the second travel trajectory TR2, the processing flow advances to step S43, and the travel trajectory generation unit 22 sets the first travel trajectory TR1 as a target travel trajectory $TR_t$ that is a target for the vehicle 1. In this case, the first travel trajectory TR1 and second travel trajectory TR2 may be assumed to match not only when they are perfectly identical, but also when the difference therebetween is within an allowable range. The difference between the two travel trajectories is assumed to be within an allowable range, as referred to herein, for example, when the difference between the first travel trajectory TR1 and second travel trajectory TR2 is equal to or less than a predetermined distance (for example, 0.5 m) in the same position of the road where the vehicle 1 is to travel. In this case, the first travel trajectory TR1 and second travel trajectory TR2 are determined to match.

When the control condition determination unit 24 determines that the first travel trajectory TR1 and second travel trajectory TR2 do not match, the processing flow advances to step S44. In step S44, the control condition determination unit 24 determines whether the operation intention of the driver can be accepted. When both determination conditions (2) and (3) in the above-described step S3 are satisfied, the control condition determination unit 24 determines that the operation intention of the driver can be accepted. Thus, in addition to confirming the operation intention of the driver in step S3, the operation intention of the driver is also confirmed in the target travel trajectory generation method A, thereby further increasing safety in a case where the executed driving assistance while accepting the operation intention of the driver.

In a case where the control condition determination unit 24 determines in step S44 that the operation intention of the driver cannot be accepted, that is, in a case where at least one of the above-described determination conditions (2) and (3) is not satisfied, the processing flow advances to step S43. In this case, the travel trajectory generation unit 22 sets the first travel trajectory TR1 as the target travel trajectory $TR_t$ that is the target for the vehicle 1. Thus, because it is undesirable that to execute the execution of the driving assistance in which the operation intention of the driver is incorporated, the driving assistance device 20 executes the driving assistance by setting the first travel trajectory TR1 obtained based on the surrounding environment information of the vehicle 1 and state parameters of the vehicle 1 as the target travel trajectory $TR_t$. As a result, sufficient safety is ensured in the driving assistance executed by the driving assistance device 20.

In a case where the control condition determination unit 24 determines in step S44 that the operation intention of the driver can be accepted, that is, when both above-described determination conditions (2) and (3) are satisfied, the processing flow advances to step S45. In this case, the travel trajectory generation unit 22 generates the target travel trajectory $TR_t$ so as to be optimized mathematically and mechanically by using the surrounding environment information of the vehicle 1 or state parameters of the vehicle 1 and also the constraints of the vehicle 1 and the operation intention of the driver (predicted operation).

Figure 13:
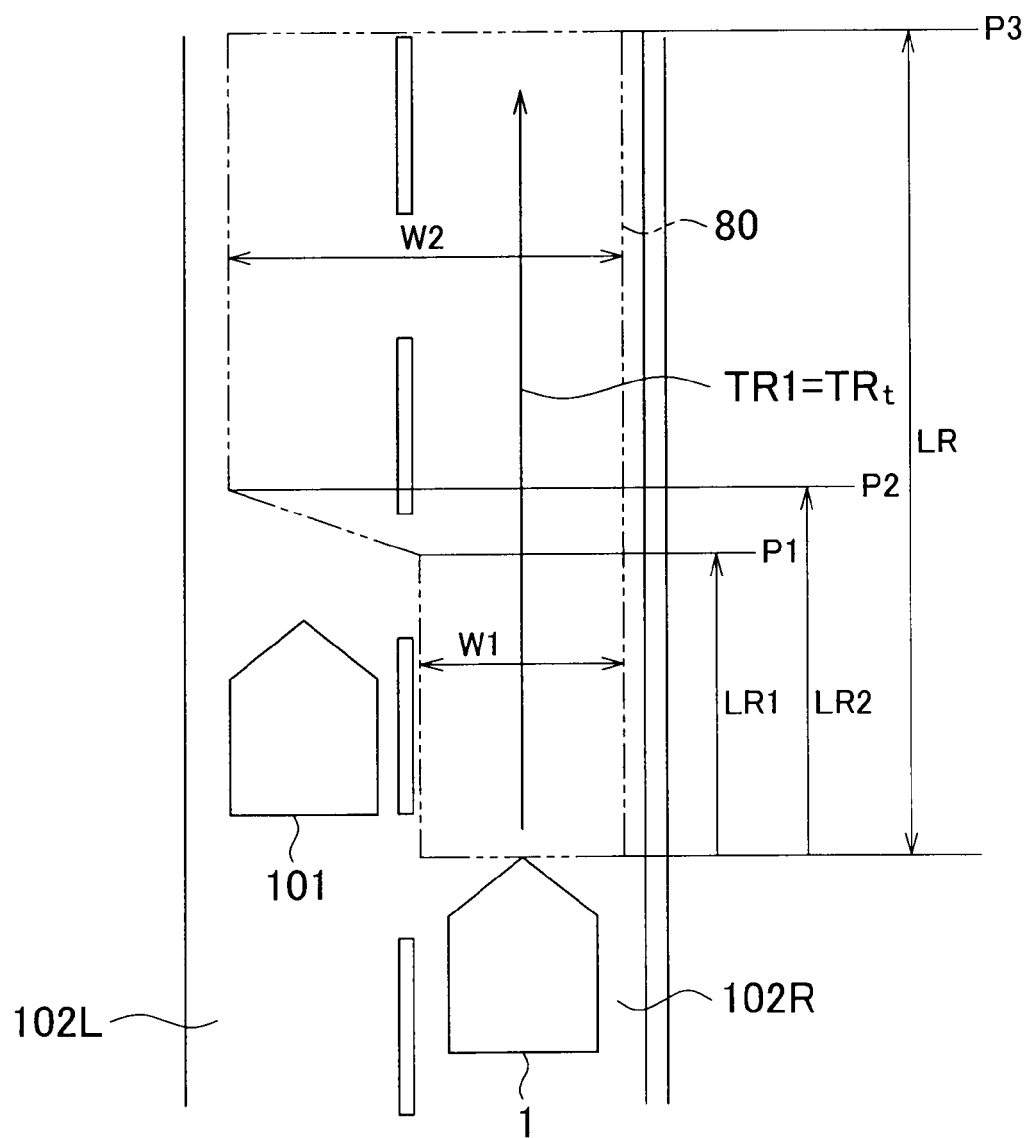
FIG. 13 illustrates a travel trajectory.
Figure 14:
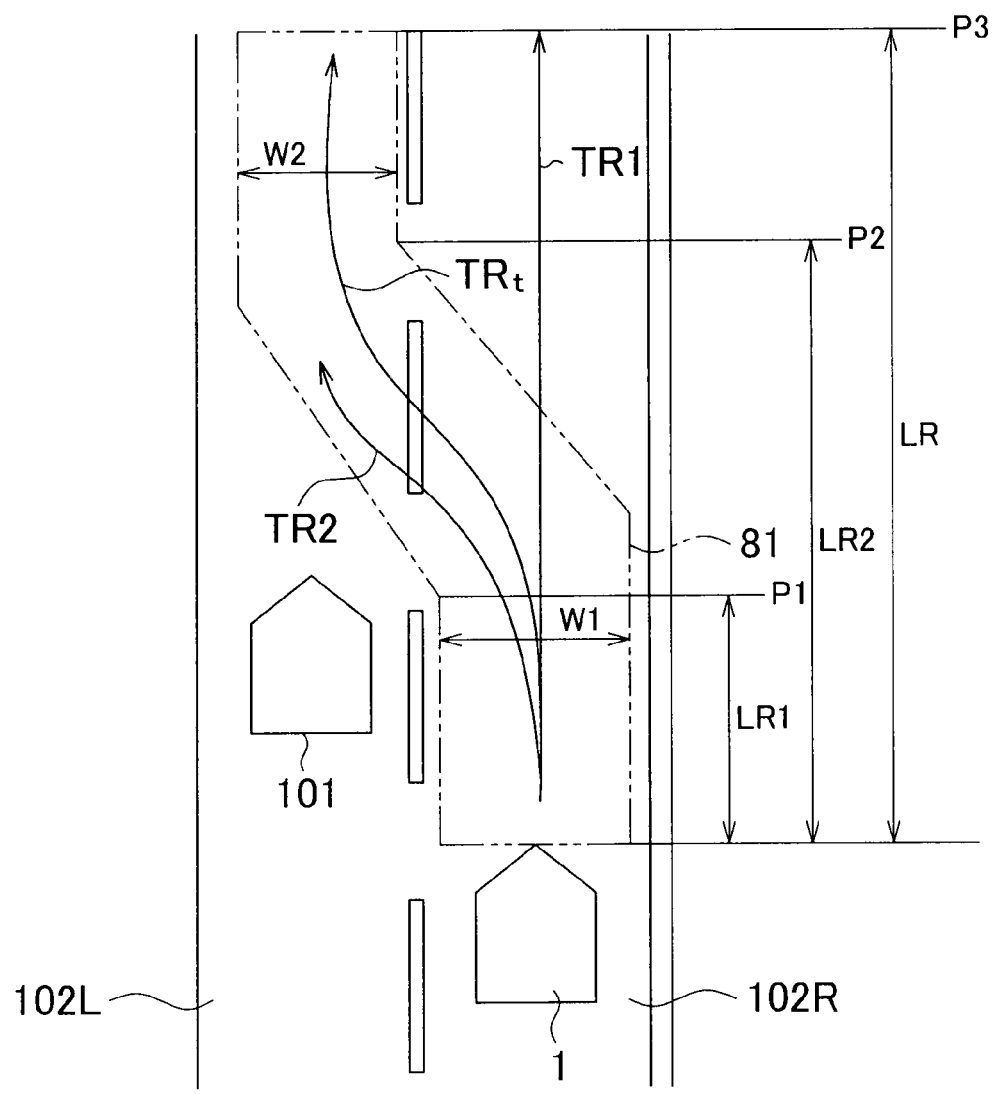
FIG. 14 illustrates a travel trajectory.
Figure 15:
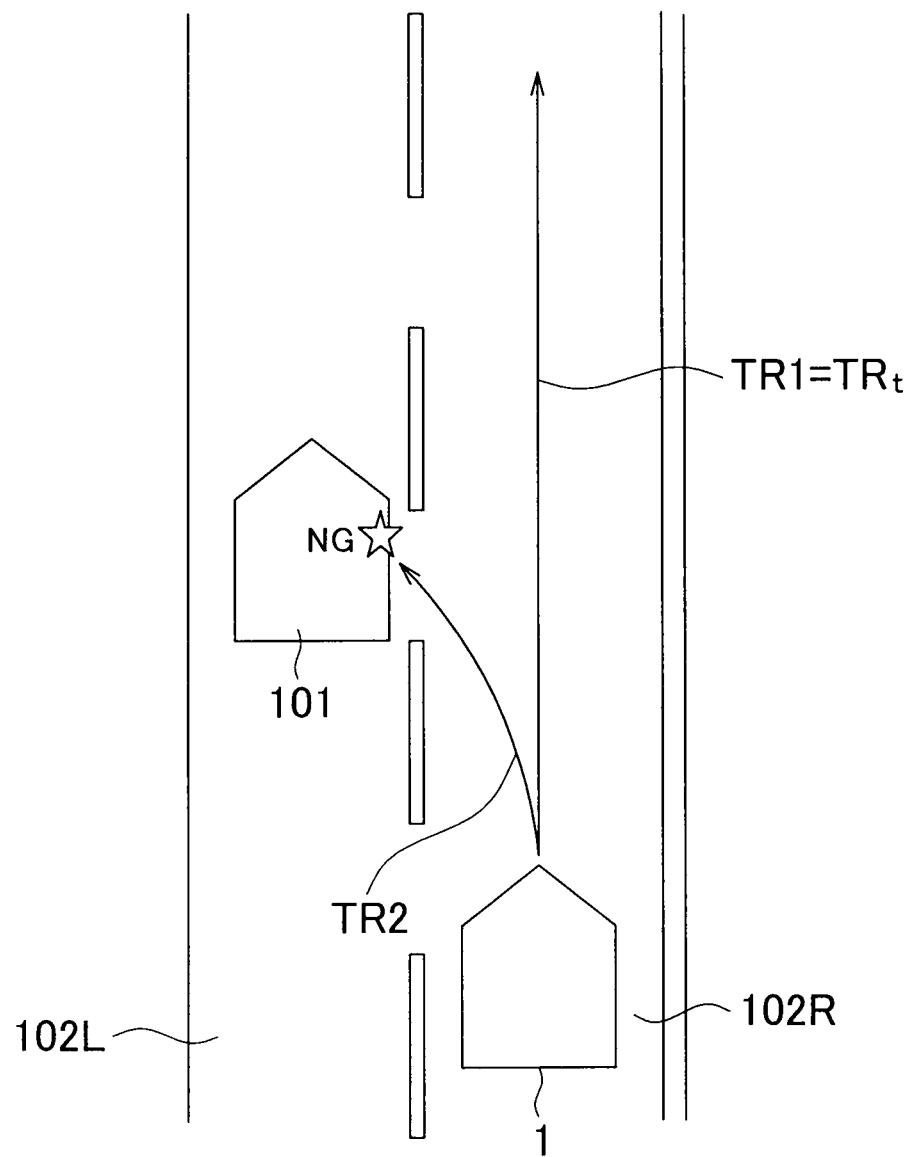
FIG. 15 illustrates a travel trajectory.

FIGS. 13 to 16 show the travel trajectories. For example, as shown in FIGS. 13 to 15, a case is considered in which when the vehicle 1 travels in the right lane 102R and another vehicle 101 travels in the left lane 102L, the first travel trajectory TR1 is generated by the above-described optimization method and the second travel trajectory TR2 is generated by the second travel trajectory generation method. When the first travel trajectory TR1 is generated by using the optimization method in the above-described step S41A, a predetermined region where the vehicle 1 is assumed to travel from now on in the road on which the vehicle 1 travels is taken as a virtual road 80 and incorporating the virtual road 80 in the constraints of the optimization method.

For example, in the example shown in FIG. 13, a virtual road 80 is set in a range of a predetermined distance LR in the traveling direction of the vehicle 1 from the front end of the vehicle 1. Here, a point at a distance of LR1 in the traveling direction of the vehicle 1 from the front end of the vehicle 1 is taken as P1, a point at a distance of LR2 is taken as P2, and a point at a distance of LR is taken as P3. It is assumed that the width of the virtual road 80 is W1 (road width almost corresponding to the right traffic lane 102R) from the front end of the vehicle 1 to P1, W2 (road width almost equal to that of a combination of the left lane 102L and right lane 102R) from P2 to P3, and changes gradually from W1 to W2 from P1 to P2. When the above-described vehicle model 1M travels on the virtual road 80, the travel trajectory generation unit 22 solves the optimization problem under a condition of optimizing a predetermined characteristic of the vehicle 1 and generates a travel trajectory. The travel trajectory thus generated is the first travel trajectory TR1.

In the example shown in FIG. 14, a target travel trajectory $TR_t$ is generated in a case where the first travel trajectory TR1 and the second travel trajectory TR2 generated in step S41B do not match and the operation intention of the driver can be accepted (step S42: No and step S44: Yes). In the example shown in FIG. 14, while the first travel trajectory TR1 is a trajectory traveling in a straight line along the right lane 102R, the operation intention of the driver of the vehicle 1 that is to change a lane from the right lane 102R to the left lane 102L has been predicted. Because the second travel trajectory TR2 generated based on the operation intention is a trajectory that the vehicle 1 change the lane, the first travel trajectory TR1 and second travel trajectory TR2 do not match.

Therefore, in step S45, the travel trajectory generation unit 22 generates a target travel trajectory $TR_t$ by incorporating the operation intention of the driver (predicted operation) to the above-described optimization method. In the embodiment, the operation intention of the driver is incorporated in the target travel trajectory $TR_t$ by changing the virtual road that is set in a predetermined region on which the vehicle 1 will travel from now on based on the operation intention of the driver in the road on which the vehicle 1 travels.

In the above-described example, it is determined in step S42 whether the first travel trajectory TR1 matches the second travel trajectory TR2 that was readily generated in step S41B. In a case where it is determined in step S42 that the first travel trajectory TR1 and second travel trajectory TR2 do not match, and it is determined in step S44 that the operation intention of the driver cannot be accepted, the target travel trajectory $TR_t$ in which the operation intention of the driver is incorporated is not generated. The target travel trajectory $TR_t$ in which the operation intention of the driver is generated in step S45, the processing load of the driving assistance device 20 is comparatively high because the optimization method is used. However, in the above-described example, whether the first travel trajectory TR1 and second travel trajectory TR2 match is determined using the second travel trajectory TR2 generated by a simple method, and the target travel trajectory $TR_t$ in which the operation intention of the driver is incorporated is not generated when the operation intention of the driver cannot be accepted even in a case in which the first travel trajectory TR1 and second travel trajectory TR2 do not match. Therefore, the processing load of the driving assistance device 20 can be reduced by comparison with the case in which the target travel trajectory $TR_t$ in which the operation intention of the driver is incorporated is generated at all times.

It is also possible that the second travel trajectory TR2 in which the operation intention of the driver is incorporated be generated by the optimization method in step S41B and whether the first travel trajectory TR1 and second travel trajectory TR2 match be determined in step S42. In this case, it is necessary to generate the second travel trajectory TR2 in which the operation intention of the driver is incorporated by using the optimization method each time the target travel trajectory generation method A is implemented. Therefore, the processing load of the driving assistance device 20 increases. However, because the second travel trajectory TR2 is generated by using the optimization method, the travel trajectory is generated with an accuracy higher than that generated by using a simple method. Therefore, the determination with a higher accuracy can be realized in step S42 or step S44.

As shown in FIG. 14, the virtual road 81 is set in a range of a predetermined distance LR in the traveling direction of the vehicle 1 from the front end of the vehicle 1. Here, a point at a distance of LR1 in the traveling direction of the vehicle 1 from the front end of the vehicle 1 is taken as P1, a point at a distance of LR2 (>LR1) is taken as P2, and a point at a distance of LR is taken as P3. The width of the virtual road 81 is set as W1 (road width almost corresponding to the right lane 102R) from the front end of the vehicle 1 to P1 in the right lane 102R and as W2 (almost the road width of the left lane 102L) from P2 to P3 in the left lane 102L. The region from P1 of the virtual road 81 to P2 is a traffic lane transition portion of gradual transition from the right lane 102R to the left lane 102L. The width of the virtual road 81 may be set at random, for example, based on the prediction accuracy of the driver's operation.

When the above-described vehicle model 1M travels on the virtual road 81, the travel trajectory generation unit 22 solves the optimization problem under a condition of optimizing a predetermined characteristic of the vehicle 1 and generates a travel trajectory. Where the travel trajectory is thus generated, the virtual road 81 is switched from the right lane 102R to the left lane 102L. Therefore, the condition of the vehicle model 1M continuing moving straightforward in the right lane 102R is canceled. Thus, the target travel trajectory $TR_t$ is generated as a trajectory for a lane change from the right lane 102R to the left lane 102L. As a result, the target travel trajectory $TR_t$ comes close to the second travel trajectory TR2 generated based on a prediction result of the driving operation of the driver, and the operation intention of the driver is incorporated in the target travel trajectory $TR_t$.

In the example shown in FIG. 15, the target travel trajectory $TR_t$ is generated when the first travel trajectory TR1 and the second travel trajectory TR2 generated in step S41B do not match and the operation intention of the driver cannot be accepted (step S42: No and step S44: No). In the example shown in FIG. 15, the second travel trajectory TR2 that is generated based on the prediction result of the driving operation of the driver may interfere with the trajectory of another vehicle 101 traveling on the adjacent layer. Therefore, the travel trajectory generation unit 22 does not accept the operation intention of the driver, and sets the first travel trajectory TR1 generated in step S41A as the target travel trajectory $TR_t$ that is the target for the vehicle 1.

Figure 16:
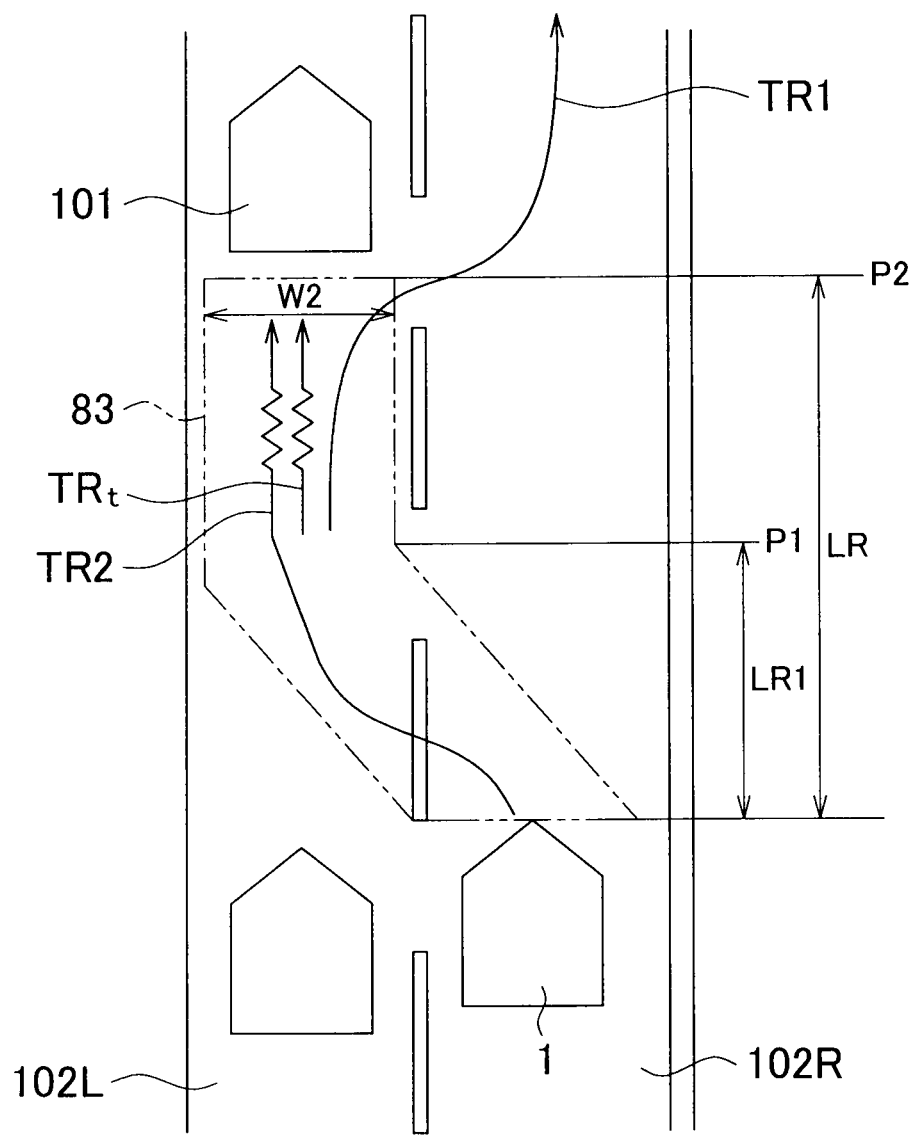
FIG. 16 illustrates a travel trajectory.

In the example shown in FIG. 16, the vehicle 1 that has changed a lane from the right lane 102R to the left lane 102L catches up to the other vehicle 101 that travels in front in the left lane 102L. In this example, it is assumed that the driver of the vehicle 1 wants to travel behind the other vehicle 101 by using the brake operation. That is, the second travel trajectory TR2 generated based on the prediction result of the driving operation by the driver is the trajectory that is decelerated by braking, and travels in a straight line in the left lane 102L. The first travel trajectory TR1 generated in step S41A is a travel trajectory of again changing the lane to the right lane 102R. In this case, the first travel trajectory TR1 and second travel trajectory TR2 do not match. Therefore, in a case where the operation intention of the driver can be accepted, the travel trajectory generation unit 22 generates the target travel trajectory $TR_t$ by incorporating the operation intention of the driver.

In this case, as shown in FIG. 16, the virtual road 83 is set in a range of a predetermined distance LR in the traveling direction of the vehicle 1 from the front end of the vehicle 1. Here, a point at a distance LR1 in the traveling direction of the vehicle 1 from the front end of the vehicle 1 is taken as P1, and a point at a distance LR is taken as P2. A region from the front end of the vehicle 1 to the P1 point in the virtual road 83 is a lane transition portion of gradual transition from the right lane 102R to the left lane 102L, and the virtual road is set in the left lane 102L with a width W2 (almost the width of the left lane 102L) from the P1 point to the P2 point.

The travel trajectory generation unit 22 solves the optimization problem under a condition of optimizing a predetermined characteristic of the vehicle 1 when the above-described vehicle model 1M travels on the virtual road 83 and generates a travel trajectory. In this case, the driver of the vehicle 1 performs braking so that the vehicle 1 does not come too close to the other vehicle 101 that travels in front. Therefore, the constraint of braking is changed so as to enable the vehicle model 1M to generate a braking force that is larger than that under the usual constraint. Where the travel trajectory is thus generated, the virtual road 83 switches from the right lane 102R to the left lane 102L and the constraint of braking is changed. Therefore, the condition of the vehicle model 1M continuing moving straightforward in the right lane 102R is canceled.

As a result, the target travel trajectory $TR_t$ enables the vehicle 1 to change the lane from the right lane 102R to the left lane 102L, and to follow the other vehicle 101 that travels in front by braking behind the other vehicle 101. As a result, the target travel trajectory $TR_t$ comes close to the second travel trajectory TR2 generated on the basis of a prediction result of the driving operation of the driver and the operation intention of the driver is incorporated in the target travel trajectory $TR_t$.

In the example shown in FIG. 16, the braking operation of the driver with respect to the vehicle 1 is predicted. In the operation of the vehicle 1, braking has the highest priority. Therefore, in this case, the travel trajectory generation unit 22 generates the target travel trajectory $TR_t$ of the vehicle 1 such that the movement in the longitudinal direction of the vehicle 1 (movement by the braking operation) has priority over the movement in the lateral direction of the vehicle 1 (movement by the steering operation, for example, a lane change). Thus, in the embodiment, when the braking operation of the driver is predicted, even when the optimum travel trajectory of the vehicle 1 (that is, the first travel trajectory TR1) is to move in the lateral direction of the vehicle 1, the trajectory that includes only the movement in the longitudinal direction of the vehicle 1 (movement by the braking operation) is generated.

Once the target travel trajectory $TR_t$ has been generated in either of step S43 or step S45, the target travel trajectory generation method A ends and the processing flow advances to step S6 shown in FIG. 3. The transition to step S6 is made even when the target travel trajectory $TR_t$ has been generated by the target travel trajectory generation method B of step S5. The target travel trajectory generation method B in step S5 is identical to a method for generating the first travel trajectory TR1 explained in the target travel trajectory generation method A.

In step S6, the control condition determination unit 24 determines whether the driver of the vehicle 1 has operated an operation means of the vehicle 1. In a case where the control condition determination unit 24 determines that the driver of the vehicle 1 has operated an operation means of the vehicle 1, the processing flow advances to step S7. In the embodiment, the steering operation of the driver is predicted in step S2A, but the actual operation performed by the driver can cause the vehicle 1 to travel along the travel trajectory that is different from the target travel trajectory $TR_t$ generated in step S4 or step S5. In such a case, the travel function control unit 23 adjusts the target travel trajectory $TR_t$ generated by the travel trajectory generation unit 22 (target travel trajectory towards the predicted steering direction or the target travel trajectory determined by the predicted braking operation) and the actual driving operation performed by the driver (steering amount or braking amount), and controls the travel function of the vehicle 1 on the basis of the adjustment result. As a result, a conflict of the control by the driving assistance and the actual operation of the driver is avoided. The adjustment between the target travel trajectory $TR_t$ and the actual driving operation performed by the driver, as referred to herein, is conducted in a case where the driver performs an actual driving operation when the vehicle 1 is controlled, by the driving assistance device 20 executing the driving assistance, to travel along the target travel trajectory $TR_t$, so as to give priority to either of the actual driving operation and the driving assistance.

In step S7, a conflict of the control by the driving assistance and actual operation performed by the driver is determined. The control condition determination unit 24 compares an actual operation amount (true operation amount) Md performed by the driver of the vehicle 1 with a control interruption determination threshold Mdc for determination to interrupt the driving assistance executed by the driving assistance device 20. In a case of steering operation, for example, the predetermined torque has been set in advance as the control interruption determination threshold Mdc. Then, when the driver operates the steering wheel 9 at a torque (corresponds to the operation amount Md) that is higher than the control interruption determination threshold Mdc, it is determined that the control performed by the driving assistance is in conflict with the actual operation performed by the driver. In a case of braking operation, for example, a predetermined master cylinder pressure that has been set in advance is taken as the control interruption determination threshold Mdc, and when the operation performed by a driver generates a master cylinder pressure (corresponds to the operation amount Md) that is higher than the control interruption determination threshold Mdc, it is determined that the control performed by the driving assistance is in conflict with the actual operation performed by the driver.

Where the control condition determination unit 24 determines in step S7 that a condition of Md<Mdc is satisfied, the conflict between the control performed by the driving assistance and the actual operation performed by the driver is within an allowable range and the processing flow advances to step S8. In step S8, the driving assistance device 20 executes the driving assistance. More specifically, the travel function control unit 23 of the driving assistance device 20 controls the actuator (for example, an electric motor) of the steering assist device 7, or the brake actuator 8, or the throttle of the vehicle 1 so that the vehicle 1 travels along the target travel trajectory $TR_t$ generated by the travel trajectory generation unit 22 in step S4 or step S5. As a result, the vehicle 1 travels along the target travel trajectory $TR_t$ generated in step S4 or step S5.

Where the control condition determination unit 24 determines in step S7 that a condition of Md≥Mdc is satisfied, there is a conflict between the control performed by the driving assistance and the actual operation performed by the driver. Therefore, the processing flow advances to step S9 and the driving assistance device 20 interrupts the driving assistance. More specifically, the travel function control unit 23 does not execute the control that causes the vehicle 1 to travel along the target travel trajectory $TR_t$ generated in step S4 or step S5. As a result, the driver's intention to operate the operation means and drive the vehicle 1 by himself is incorporated in the driving of the vehicle 1. Therefore, the vehicle 1 can travel according to the driver's plan. As a result, the degradation of operation feeling and decrease in drivability can be inhibited.

When the control condition determination unit 24 determines in the above-described step S6 that the driver of the vehicle 1 does not operate the operation means of the vehicle 1, the processing flow advances to step S8, and the driving assistance device 20 executes the driving assistance. As a result, the vehicle 1 travels along the target travel trajectory $TR_t$ generated in step S4 or step S5.

In the driving assistance method of the embodiment, the driver's operation is predicted and incorporated in the generation of the target travel trajectory $TR_t$. Therefore, when the driving assistance is performed so that the vehicle 1 travels along the target travel trajectory $TR_t$, the travel of the vehicle 1 reflects the driver's intention. Therefore, the discrepancy between the control by the driving assistance and the driver's intension is inhibited and the driver hardly feels uncomfortable when the driving assistance is executed by the driving assistance device 20. Further, because the possibility of a discrepancy occurring between the control by the driving assistance and the driver's intension is reduced, the necessity of adjusting the two is also reduced. As a result, the processing load of the driving assistance device 20 required for the adjustment is also reduced.

Even when the driver performs an operation when the driving assistance is executed so that the vehicle 1 travels along the target travel trajectory $TR_t$, the driver hardly feels uncomfortable because the operation intention of the driver is incorporated in the target travel trajectory $TR_t$. Further, in this case, the operation amount necessary for the driver to follow his own operation intention is reduced, and the possibility of the driver feeling uncomfortable is reduced. Therefore, the necessity of the driver operating the operation means of the vehicle 1 is also reduced.

In the embodiment, the target travel trajectory $TR_t$ is generated, then it is determined whether an operation has been performed by the driver, and then the driving assistance is executed (step S6 and step S7 in FIG. 3). However, the embodiment is not limited to such a configuration and it is also possible to generate the target travel trajectory $TR_t$, then execute the driving assistance, then determine whether a driver's operation is present, and then adjust the control of the driving assistance and the intention of the driver.

Variation Example

Figure 17:
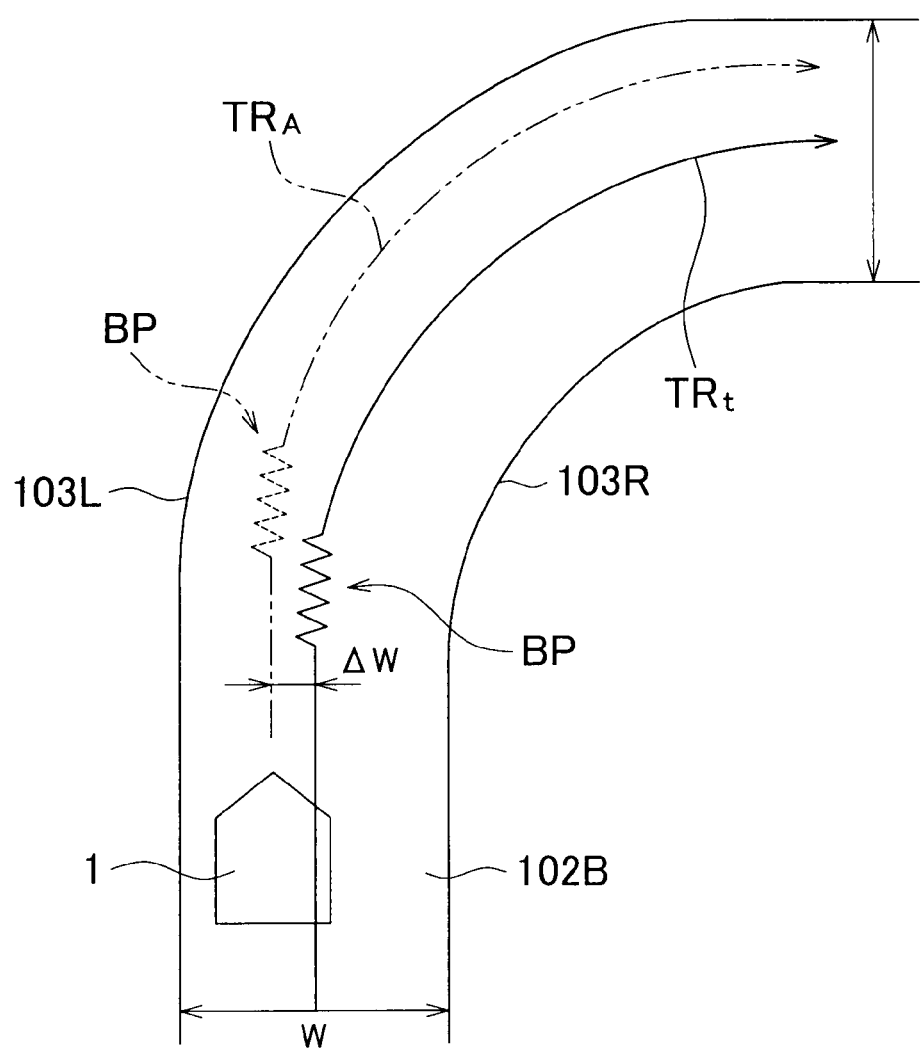
FIG. 17 is an explanatory drawing illustrating a driving assistance method according to a variation example of the embodiment.
Figure 18:
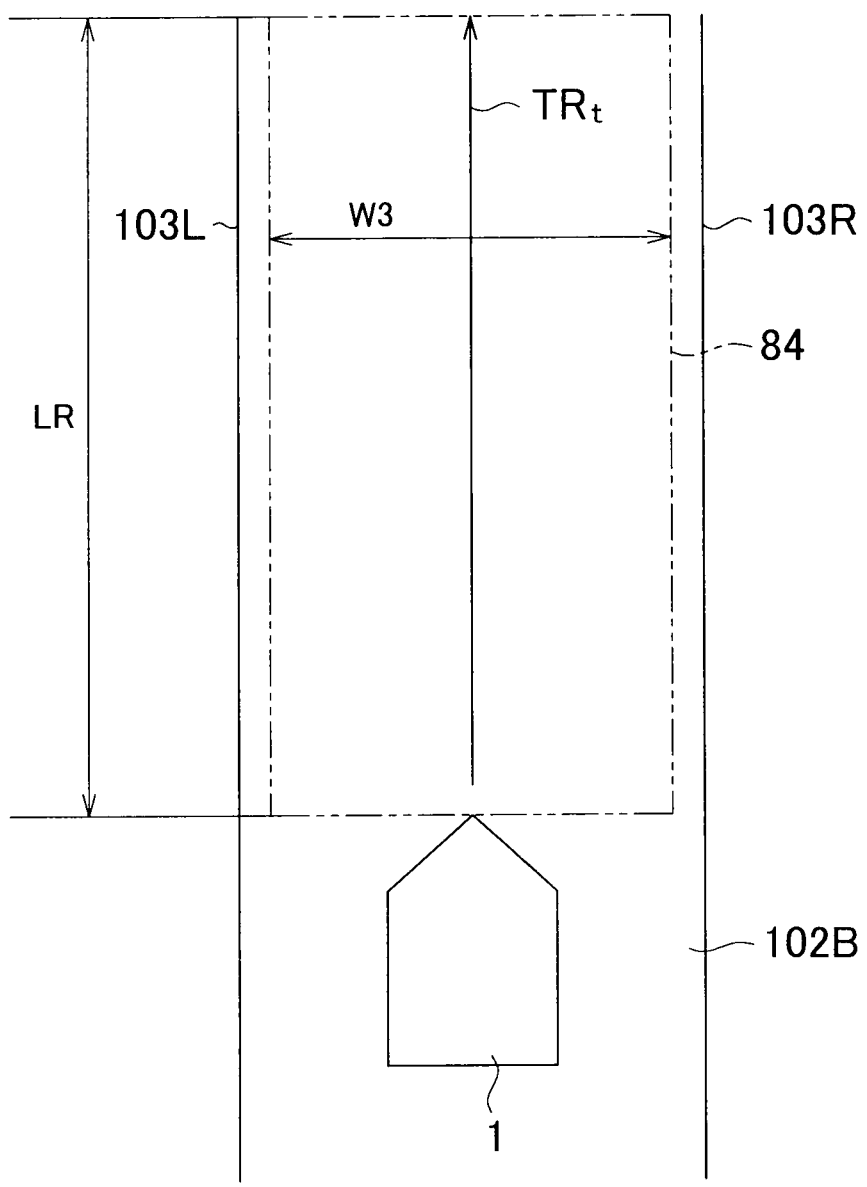
FIG. 18 is an explanatory drawing illustrating a driving assistance method according to a variation example of the embodiment.
Figure 19:
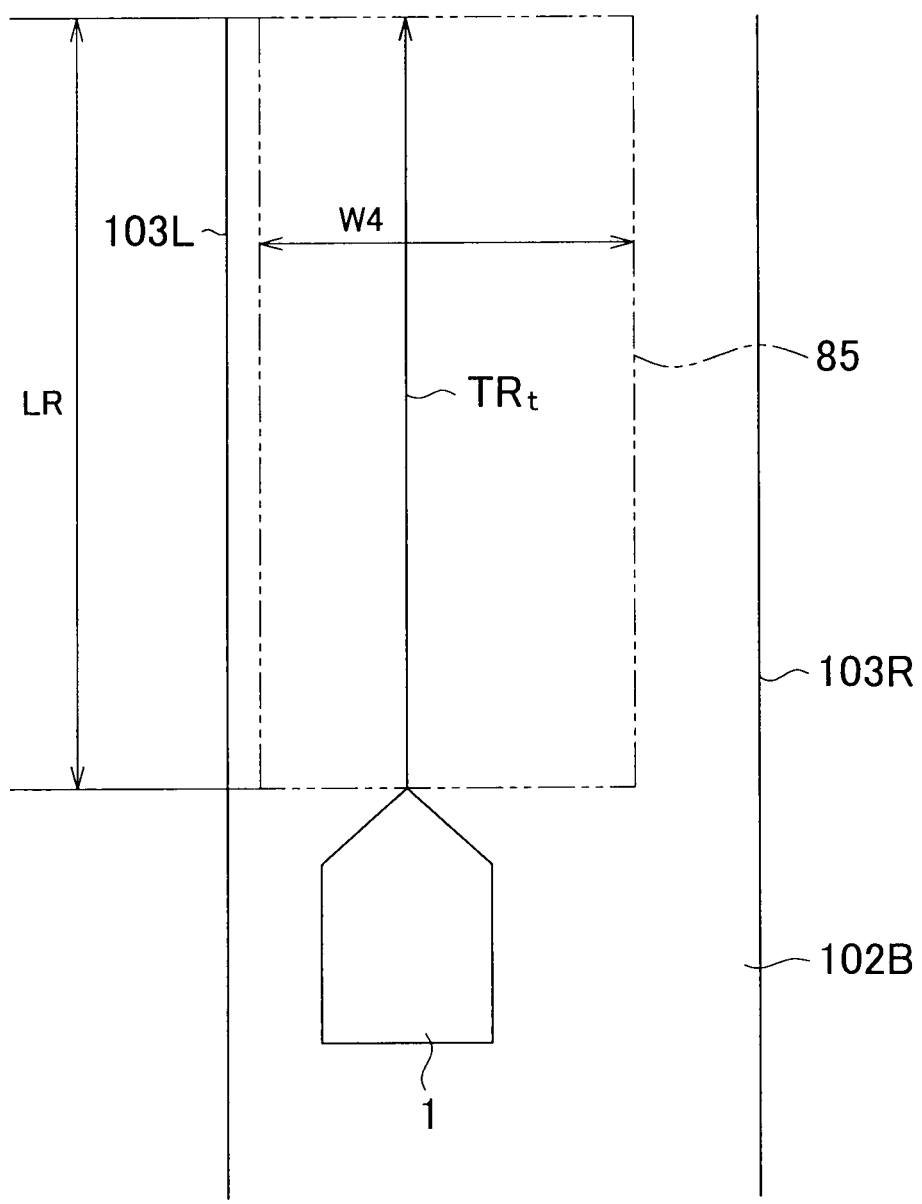
FIG. 19 is an explanatory drawing illustrating a driving assistance method according to a variation example of the embodiment.

FIGS. 17 to 19 are explanatory drawings illustrating a driving assistance method of a variation example of the embodiment. The variation example differs from the above-described embodiment in that the tendency of driver's operation is predicted from the operation history of the operation means of the vehicle 1 by the driver and the target travel trajectory is generated based on the prediction result. As shown in FIG. 17, when the vehicle 1 travels on the road 102B marked out with two lane markings 103L and 103R, it is assumed that the driver of the vehicle 1 tends to travel close to the left side of the road 102B. When this tendency of the driver when the driver drives the vehicle 1 is not taken into account, a displacement (ΔW) occurs, as shown in FIG. 17, between the target travel trajectory $TR_t$ generated by the above-described target travel trajectory generation method and the actual travel trajectory $TR_A$ of the vehicle 1. When the driving assistance device 20 executes the driving assistance by using the target travel trajectory $TR_t$, the driver of the vehicle 1 constantly feels uncomfortable due to this displacement. Further, when this tendency of the driver when the driver drives the vehicle 1 is not taken into account, a braking point BP for reducing the speed of the vehicle 1 such that the vehicle 1 could enter the curve is shifted and the driver of the vehicle 1 feels uncomfortable.

In the present variation example, when the target travel trajectory $TR_t$ is generated, the history of driver's operation is stored in the storage unit 16 of the ECU 10 and the operation tendency of the driver is predicted based on the operation history. Further, for example, in step S45 of the target travel trajectory generation method shown in FIG. 8, the target travel trajectory $TR_t$ is generated by using the predicted operation tendency of the driver. As a result, the target travel trajectory $TR_t$ that takes into account the operation tendency of the driver can be generated. Therefore, where the driving assistance is executed by using this target travel trajectory, the displacement between the target travel trajectory $TR_t$ and the actual travel trajectory $TR_A$ of the vehicle 1 is reduced. As a result, in the control of the driving assistance using the target travel trajectory $TR_t$, the uncomfortable feeling of the driver can be reduced and therefore the correction operation of the driver can be also reduced. A method for incorporating the operation tendency of the driver in the target travel trajectory $TR_t$ will be explained below.

FIG. 18 illustrates a case in which the driver of the vehicle 1 travels in the center of the road 102B. FIG. 19 illustrates a case in which the driver of the vehicle 1 travels closer to the left side of the road 102B. In the target travel trajectory generation method of the embodiment, the virtual road that is set in a predetermined region in which the vehicle 1 is supposed to travel in the road 102B in which the vehicle 1 travels is changed based on the operation tendency of the driver, whereby the operation tendency of the driver is incorporated in the target travel trajectory $TR_t$.

In the example shown in FIG. 18, the virtual road 84 is set in a range of a predetermined distance LR from the front end of the vehicle 1 in the traveling direction of the vehicle 1. The virtual road 84 is set between the lane markings 103L and 103R and has a width W3 (practically same as the width of the road 102B) from the front end of the vehicle 1 to a point at a predetermined distance LR therefrom. The travel trajectory generation unit 22 solves the optimization problem under a condition of optimizing a predetermined characteristic of the vehicle 1 when the above-described vehicle model 1M travels along the virtual road 84 and generates the target travel trajectory $TR_t$. As a result, the target travel trajectory $TR_t$ can be generated in which the tendency of the driver to travel in the center of the road 102B is incorporated.

In a case where the operation history of the driver shows a tendency of the driver to travel on the left side of the road 102B, as shown in FIG. 19, the virtual road 85 is set in a range of a predetermined distance LR from the front end of the vehicle 1 in the traveling direction of the vehicle 1 and closer to the left lane marking 103L. In this case, the distance between the virtual road 85 and left lane marking 103L is set less than the distance between the virtual road 85 and right lane marking 103R. The width of the virtual road 84 is W4 and set less than the width of the road 102B.

Thus, the travel trajectory generation unit 22 solves the optimization problem under a condition of optimizing a predetermined characteristic of the vehicle 1 when the above-described vehicle model 1M travels along the virtual road 85 that has been set closer to the left side of the road 102B and generates the target travel trajectory $TR_t$. As a result, the target travel trajectory $TR_t$ can be generated in which the tendency of the driver to travel closer to the left side of the road 102B is incorporated. The driving assistance device 20 executes the driving assistance by using the target travel trajectory $TR_t$, whereby the uncomfortable feeling of the driver that tends to travel closer to the left side of the road 102B when the driving assistance is executed is reduced. In the above-described example, the tendency of the driver to travel in a certain position in the lateral direction of the road 102B is predicted. The operation tendency of the accelerator pedal or operation tendency of braking can be also predicted by using the preceding operation history and incorporated in the generation of the target travel trajectory $TR_t$.

When the operation tendency of the driver is predicted, the driving assistance device 20 acquires information on the lane markings 103L and 103R, for example, by using a camera as an traveling direction information detection sensor 43 as shown in FIG. 1 and specifies the road 102B where the vehicle 1 travels. Then, the driving assistance device 20 finds a degree to which the vehicle 1 shifts in the lateral direction of the road 102B from the center of the road 102B (a position in the center between the position of the lane marking 103L and the position of the lane marking 103R) by image processing and stores this shift (vehicle offset) in the storage unit 16. Then, for example, a value obtained by averaging the vehicle offset history is used as the operation tendency of the driver. In this case, it is possible to predict the position in which the driver has a tendency to travel in the lateral direction of the road 102B.

In the present variation example, when the target travel trajectory $TR_t$ is generated, the operation tendency of the diver is incorporated from the very beginning but such a procedure is not limited to this variation example. For example, in step S41B shown in FIG. 8, the travel trajectory generation unit 22 generates the second travel trajectory TR2 in which the operation tendency of the driver is incorporated, and the control condition determination unit 24 compares the first travel trajectory TR1 with the second travel trajectory TR2 in step S42. When the first travel trajectory TR1 and second travel trajectory TR2 do not match, that is, when an unallowable difference appears between the first travel trajectory TR1 and second travel trajectory TR2, the processing flow advances to step S45. In step S45, the travel trajectory generation unit 22 generates the target travel trajectory $TR_t$ by incorporating the operation tendency of the driver to the above-described optimization method.

In the above-described embodiment and variation example thereof, the operation of the driver is predicted or the operation tendency of the driver is predicted and at least one of them is incorporated in generating the target travel trajectory. The driving assistance is then executed so that the vehicle travels along the target travel trajectory that has been thus generated. As a result, in the embodiment and variation example thereof, because information indicating the operation that will be next performed by the driver can be included in the target travel trajectory $TR_t$, the discrepancy between the travel of the vehicle by the driving assistance device executing the driving assistance, and the travel of the vehicle intended by the driver is inhibited. As a result, the driver hardly feels uncomfortable when the driving assistance is executed by the driving assistance device. In addition, the amount of operations to be performed by the driver to drive the vehicle according to the driver's intension is reduced.

What is claimed is:

1. A driving assistance device, comprising:
   at least one processor programmed to perform as:
   an operation prediction unit that predicts that a driving operation is to be performed by a driver of a vehicle before the driver performs the driving operation;
   a travel trajectory generation unit that generates a target travel trajectory of the vehicle based on a prediction result of the driving operation that has been predicted by the operation prediction unit; and
   a travel function control unit that controls a travel function of the vehicle based on a result of adjusting the target travel trajectory generated by the travel trajectory generation unit and an actual driving operation by the driver,
   wherein the travel trajectory generation unit generates a first travel trajectory based on information relating to environment surrounding the vehicle, generates a second travel trajectory based on the prediction result of the driving operation that has been predicted by the operation prediction unit, and generates the target travel trajectory based on a result of comparing the first travel trajectory and the second travel trajectory,
   wherein the operation prediction unit predicts the driving operation based on musculoskeletal state information of the driver,
   wherein the operation prediction unit predicts the driving operation so as to satisfy a constraint that is a range of motion of a body part that relates to the driving operation, the range of motion being determined based on a range of motion of human body joint,
   wherein the operation prediction unit predicts a steering direction in which the driver performs steering operation based on a constraint of an arm that is determined based on a range of motion of an elbow joint,
   wherein the travel trajectory generation unit generates the target travel trajectory following the steering direction when the steering operation by the driver is predicted, and wherein the operation prediction unit calculates an inclination degree of a shoulder line of the driver and an inclination degree of a body trunk based on the obtained musculoskeletal information of the driver, and predicts the steering direction and an operation amount of the steering wheel by which the driver performs the steering operation based on the degree of inclination of shoulder line and the degree of the inclination of the body trunk of the driver.

2. The driving assistance device according to claim 1, wherein when there is an unallowable difference between the first travel trajectory and the second travel trajectory, the travel trajectory generation unit generates the target travel trajectory by using the prediction result of the driving operation that has been predicted by the operation prediction unit.

3. The driving assistance device according to claim 1, further comprising a driving assistance unit that executes a driving assistance based on the target travel trajectory generated by the travel trajectory generation unit.

4. The driving assistance device according to claim 1, wherein
the operation prediction unit predicts a steering direction in which the driver performs steering operation;
the travel trajectory generation unit generates the target travel trajectory following the steering direction when the steering operation by the driver is predicted; and
the travel function control unit adjusts the target travel trajectory following the steering direction generated by the travel trajectory generation unit and an actual steering operation by the driver, and controls a travel function of the vehicle based on the adjustment result.

5. The driving assistance device according to claim 1, wherein
the operation prediction unit predicts a braking operation by the driver;
the travel trajectory generation unit generates a travel trajectory of the vehicle by assigning higher priority to a movement in the longitudinal direction of the vehicle than to a movement in the lateral direction of the vehicle when the braking operation by the driver is predicted; and
the travel function control unit adjusts the travel trajectory of the vehicle generated by the travel trajectory generation unit and an actual braking operation performed by the driver, and controls a travel function of the vehicle based on the adjustment result.

6. The driving assistance device according to claim 1, wherein the travel function control unit adjusts so as to give priority to one of the actual driving operation and a driving assistance based on the target travel trajectory generated by the travel trajectory generation unit.

7. The driving assistance device according to claim 6, wherein the travel function control unit determines whether to interrupt the driving assistance based on a result of comparing an actual operation amount by the driver with a predetermined threshold.

8. The driving assistance device according to claim 1, wherein the first travel trajectory and the second trajectory are respective paths along which the vehicle is assumed to travel.

9. The driving assistance device according to claim 8, wherein the first travel trajectory and the second travel trajectory respectively include information relating to speed and acceleration of the vehicle.

10. The driving assistance device according to claim 1, wherein the operation prediction unit predicts the steering direction and the operation amount of the steering wheel so that motion of a joint of the driver is confined within the range of motion of the elbow joint.

11. A driving assistance method comprising:
predicting that a driving operation is to be performed by a driver of a vehicle before the driver performs the driving operation;
generating, via a processor, a target travel trajectory of the vehicle based on a prediction result of the driving operation; and
controlling a travel function of the vehicle based on a result of adjusting the target travel trajectory and an actual driving operation by the driver,
wherein the target travel trajectory is generated based on a result of comparing a first travel trajectory that is generated based on information relating to environment surrounding the vehicle and a second travel trajectory that is generated based on a prediction result of the driving operation,
wherein the predicting includes
predicting the driving operation based on musculoskeletal state information of the driver,
predicting the driving operation so as to satisfy a constraint that is a range of motion of a body part that relates to the driving operation, the range of motion being determined based on a range of motion of human body joint, and
predicting a steering direction in which the driver performs steering operation based on a constraint of an arm that is determined based on a range of motion of an elbow joint,
wherein the generating includes generating the target travel trajectory following the steering direction when the steering operation by the driver is predicted, and
wherein the predicting includes
calculating an inclination degree of a shoulder line of the driver and an inclination degree of a body trunk based on the obtained musculoskeletal information of the driver, and
predicting the steering direction and an operation amount of the steering wheel by which the driver performs the steering operation based on the degree of inclination of shoulder line and the degree of the inclination of the body trunk of the driver.

12. The driving assistance method according to claim 11, wherein when there is an unallowable difference between the first travel trajectory and the second travel trajectory, the target travel trajectory is generated by using a prediction result of the driving operation.

13. The driving assistance method according to claim 11, wherein the driving operation is predicted based on musculoskeletal state information of the driver.

14. The driving assistance method according to claim 13, wherein the driving operation is predicted so as to satisfy a constraint that is a range of motion of a body part that relates to the driving operation, the range of motion being determined based on a range of motion of human body joint.

15. The driving assistance method according to claim 11, wherein the first travel trajectory and the second travel trajectory are respective paths along which the vehicle is assumed to travel.

16. A driving assistance device, comprising:
at least one processor programmed to perform as:
an operation prediction unit that predicts that a driving operation is to be performed by a driver of a vehicle before the driver performs the driving operation;

a travel trajectory generation unit that generates a target travel trajectory of the vehicle based on a prediction result of the driving operation that has been predicted by the operation prediction unit; and a travel function control unit that controls a travel function of the vehicle based on a result of adjusting the target travel trajectory generated by the travel trajectory generation unit and an actual driving operation by the driver, wherein the travel trajectory generation unit generates a first travel trajectory based on information relating to environment surrounding the vehicle, generates a second travel trajectory based on the prediction result of the driving operation that has been predicted by the operation prediction unit, and generates the target travel trajectory based on a result of comparing the first travel trajectory and the second travel trajectory, wherein the operation prediction unit predicts the driving operation based on musculoskeletal state information of the driver, wherein the operation prediction unit predicts the driving operation so as to satisfy a constraint that is a range of motion of a body part that relates to the driving operation, the range of motion being determined based on a range of motion of human body joint, wherein the operation prediction unit predicts a braking operation by the driver based on a constraint of a leg that is determined based on a range of motion of a knee joint and a thigh joint, wherein when the braking operation by the driver is predicted, the travel trajectory generation unit generates the travel trajectory of the vehicle by assigning higher priority to a movement in the longitudinal direction of the vehicle than to a movement in the lateral direction of the vehicle, wherein the operation prediction unit predicts whether the braking operation is performed by the driver and an operation amount by which the driver performs the braking operation, and wherein the operation prediction unit calculates an inclination of a trunk line or the driver and a variation of distribution of load in a bearing surface of a seat where the driver sits based on the musculoskeletal information of the driver, and predicts whether the braking operation is performed by the driver and the operation amount based on the inclination of the trunk line of the driver and the variation of distribution of the load in the bearing surface of the seat.

17. The driving assistance device according to claim 16, wherein the operation prediction unit predicts whether the braking operation is performed by the driver and the operation amount so that motions of joints of the driver are confined within the range of motion of the knee joint and the range of motion of the thigh joint.

18. A driving assistance method comprising:

predicting that a driving operation is to be performed by a driver of a vehicle before the driver performs the driving operation;

generating, via a processor, a target travel trajectory of the vehicle based on a prediction result of the driving operation; and controlling a travel function of the vehicle based on a result of adjusting the target travel trajectory and an actual driving operation by the driver, wherein the target travel trajectory is generated based on a result of comparing a first travel trajectory that is generated based on information relating to environment surrounding the vehicle and a second travel trajectory that is generated based on a prediction result of the driving operation, wherein the predicting includes predicting the driving operation based on musculoskeletal state information of the driver, predicting the driving operation so as to satisfy a constraint that is a range of motion of a body part that relates to the driving operation, the range of motion being determined based on a range of motion of human body joint, and predicting a braking operation by the driver based on a constraint of a leg that is determined based on a range of motion of a knee joint and a thigh joint, wherein when the braking operation by the driver is predicted, the generating includes generating the travel trajectory of the vehicle by assigning higher priority to a movement in the longitudinal direction of the vehicle than to a movement in the lateral direction of the vehicle, wherein the predicting includes:

predicting whether the braking operation is performed by the driver and an operation amount by which the driver performs the braking operation, calculating an inclination of a trunk line of the driver and a variation of distribution of load in a bearing surface of a seat where the driver sits based on the musculoskeletal information of the driver, and predicting whether the braking operation is performed by the driver and the operation amount based on the inclination of the trunk line of the driver and the variation of distribution of the load in the bearing surface of the seat.

* * * * *